US012572038B2

(12) United States Patent
Yuan et al.

(10) Patent No.: US 12,572,038 B2
(45) Date of Patent: Mar. 10, 2026

(54) MASS TRANSFER METHOD FOR MICRO LIGHT-EMITTING DIODES, AND DISPLAY PANEL

(71) Applicant: BOE Technology Group Co., Ltd., Beijing (CN)

(72) Inventors: Guangcai Yuan, Beijing (CN); Haixu Li, Beijing (CN); Shulei Li, Beijing (CN); Lubin Shi, Beijing (CN); Zhao Kang, Beijing (CN); Hua Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 373 days.

(21) Appl. No.: 18/032,789

(22) PCT Filed: Oct. 30, 2020

(86) PCT No.: PCT/CN2020/125493
§ 371 (c)(1),
(2) Date: Apr. 19, 2023

(87) PCT Pub. No.: WO2022/088095
PCT Pub. Date: May 5, 2022

(65) Prior Publication Data
US 2024/0019726 A1 Jan. 18, 2024

(51) Int. Cl.
*G02F 1/13* (2006.01)
*G02F 1/1333* (2006.01)

(52) U.S. Cl.
CPC .. *G02F 1/133354* (2021.01); *G02F 1/133377* (2013.01)

(58) Field of Classification Search
CPC ..................... G02F 1/133354; G02F 1/133377
USPC ............................................................ 257/89
See application file for complete search history.

(56) References Cited

U.S. PATENT DOCUMENTS

| | | | |
|---|---|---|---|
| 2010/0259164 A1 | 10/2010 | Oohata et al. | |
| 2018/0096977 A1 | 4/2018 | Ahmed et al. | |
| 2019/0371213 A1* | 12/2019 | Liu ........................... | G09F 9/33 |
| 2019/0393066 A1 | 12/2019 | Hong | |

(Continued)

FOREIGN PATENT DOCUMENTS

| | | |
|---|---|---|
| CN | 101859714 A | 10/2010 |
| CN | 108962789 A | 12/2018 |

(Continued)

OTHER PUBLICATIONS

CN 202080002602.4 first office action.
PCT/CN2020/125493 international search report.

*Primary Examiner* — Phuc T Dang
(74) *Attorney, Agent, or Firm* — IPro, PLLC

(57) ABSTRACT

A mass transfer method for micro light-emitting diodes (W) includes: picking up micro light-emitting diodes (W) on an element substrate (200) by using a transfer substrate (300), and transferring the micro light-emitting diodes (W) after pickup to an intermediate carrying substrate (400); and transferring micro light-emitting diodes (W), which are on the intermediate carrying substrate (400) and correspond to all sub-pixels (SPX) on a target substrate (100), into the sub-pixels (SPX) of the target substrate (100) at one time, such that all the sub-pixels (SPX) on the target substrate (100) receives the micro light-emitting diodes (W) at one time.

18 Claims, 15 Drawing Sheets

Pick up micro light emitting diodes on an element substrate through a transfer substrate and transfer the micro light emitting diodes after pickup to an intermediate carrying substrate — S10

Transfer micro light emitting diodes, corresponding to all sub-pixels on a target substrate, on the intermediate carrying substrate into the sub-pixels of the target substrate at one time, so that all the sub-pixels on the target substrate receive the micro light emitting diodes at one time — S20

(56)            References Cited

U.S. PATENT DOCUMENTS

| 2020/0258870 | A1 | 8/2020 | Liu et al. |
| 2020/0312925 | A1 | 10/2020 | Xia et al. |
| 2021/0335647 | A1 | 10/2021 | Fan |

FOREIGN PATENT DOCUMENTS

| CN | 109410775 | A | | 3/2019 | |
| CN | 109661122 | A | * | 4/2019 | ........... H05K 13/046 |
| CN | 109935599 | A | * | 6/2019 | ............. H10K 59/70 |
| CN | 110828364 | A | * | 2/2020 | .............. G09F 9/33 |
| CN | 111081604 | A | | 4/2020 | |
| CN | 111489992 | A | | 8/2020 | |

* cited by examiner

W

310

300

420
410  400

A
A'

ZZ1
ZZ2
ZZ3
ZZ4

410

400

410

400

500

KG

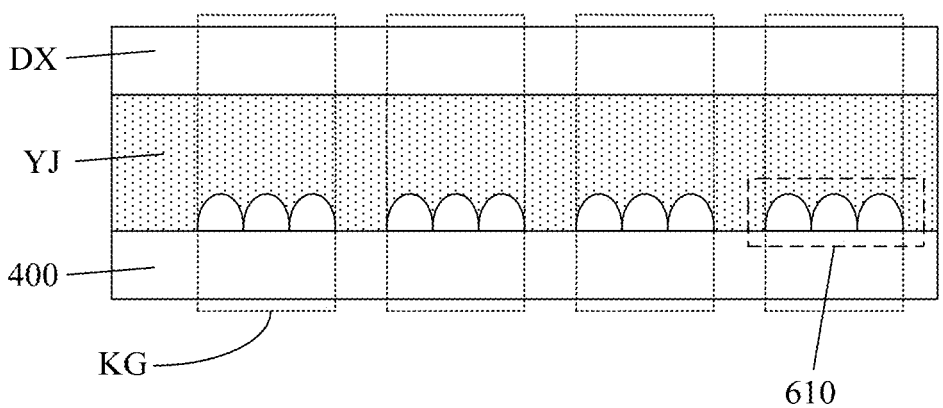
DX
YJ
400
KG
610
Fig. 8A
DX
YJ
ZL
510
400
KG
610
Fig. 8B
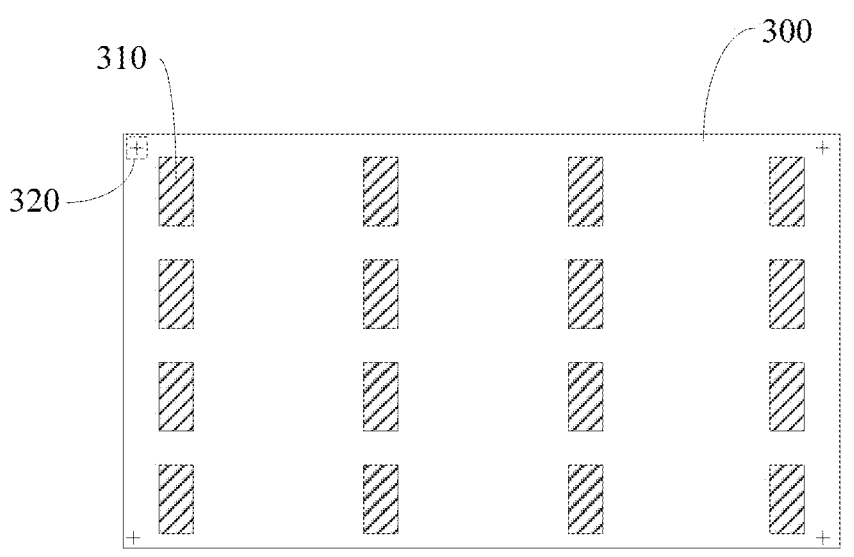
310
300
320
Fig. 9

MASS TRANSFER METHOD FOR MICRO LIGHT-EMITTING DIODES, AND DISPLAY PANEL

CROSS-REFERENCE TO RELATED APPLICATIONS

This application is a National Stage of International Application No. PCT/CN2020/125493, filed Oct. 30, 2020, the entire content of which is hereby incorporated by reference.

FIELD

The present disclosure relates to the technical field of mass transfer, and in particular to a mass transfer method for micro light emitting diodes, and a display panel.

BACKGROUND

The micro light emitting diode (Micro LED), a miniaturized and matrixed structure of the traditional light emitting diode, is used as a display component. The micro light emitting diode (Micro LED) has become the research focus in the field of display because of its small size, high resolution, high brightness, high luminous efficiency, low power consumption, etc.

SUMMARY

Embodiments of the present disclosure provide a mass transfer method for micro light emitting diodes. The method includes:

picking up the micro light emitting diodes on an element substrate through a transfer substrate and transferring the micro light emitting diodes after pickup to an intermediate carrying substrate; and transferring micro light emitting diodes, corresponding to all sub-pixels on a target substrate, on the intermediate carrying substrate into the sub-pixels of the target substrate at a time, so that all the sub-pixels on the target substrate receive micro light emitting diodes at a time.

In some examples, a light control substrate is formed on one side, facing away from transferred micro light emitting diodes, of the intermediate carrying substrate. The light control substrate is provided with a plurality of light control regions which are arranged at intervals. An orthographic projection, on the intermediate carrying substrate, of one of the light control regions covers an orthographic projection, on the intermediate carrying substrate, of one of the micro light emitting diodes on the intermediate carrying substrate. A gap between two adjacent sub-pixels in the target substrate covers at least one micro light emitting diode.

The transferring micro light emitting diodes, corresponding to all sub-pixels on a target substrate, on the intermediate carrying substrate into the sub-pixels of the target substrate at a time, so that the all the sub-pixels on the target substrate receive micro light emitting diodes at a time includes:

aligning the intermediate carrying substrate with the target substrate for attachment;

controlling light control regions, corresponding to the sub-pixels of the target substrate, of the light control substrate to transmit light, and controlling other light control regions to shield light; and separating micro light emitting diodes, corresponding to light-transmitting light control regions, on the intermediate carrying substrate from the intermediate carrying substrate through laser irradiation, to transfer the micro light emitting diodes on the intermediate carrying substrate into the sub-pixels on the target substrate, so that all the sub-pixels on the target substrate receive micro light emitting diodes at a time.

In some examples, the light control substrate is a liquid crystal display, and the intermediate carrying substrate serves as a substrate of an array substrate in the liquid crystal display.

In some examples, the light control substrate is a liquid crystal display, the intermediate carrying substrate is positioned on one side, facing away from of a liquid crystal layer, of an array substrate in the liquid crystal display, and a bonding layer is formed between the intermediate carrying substrate and the array substrate.

In some examples, a lens layer is formed on one side, facing the intermediate carrying substrate, of the liquid crystal layer of the liquid crystal display, the lens layer including a plurality of lens structures, and an orthographic projection, on the intermediate carrying substrate, of one of the lens structures at least having an overlapping region with one of the light control regions.

In some examples, the picking up the micro light emitting diodes on an element substrate through a transfer substrate and transferring to an intermediate carrying substrate after pickup includes:

picking up all micro light emitting diodes, corresponding to a transfer region, on the element substrate through the transfer substrate, the element substrate being provided with a plurality of micro light emitting diodes, the transfer substrate including a plurality of transfer regions, and an orthographic projection, on the element substrate, of one of the transfer regions being positioned in one of the element substrates; and transferring the micro light emitting diodes on the transfer substrate to the intermediate carrying substrate at a time, the intermediate carrying substrate including a plurality of intermediate carrying regions, and one of the intermediate carrying regions corresponding to one of the transfer regions.

In some examples, a distance between two adjacent intermediate carrying regions equals an integral multiple of a width of one micro light emitting diode on the element substrate; and/or a distance between the sub-pixels of the target substrate equals an integral multiple of a width of one micro light emitting diode on the intermediate carrying substrate.

In some examples, the transferring micro light emitting diodes, corresponding to all sub-pixels on a target substrate, on the intermediate carrying substrate into the sub-pixels of the target substrate at a time, so that all the sub-pixels on the target substrate receive micro light emitting diodes at a time includes:

box-aligning the intermediate carrying substrate with the target substrate under a first set pressure;

press-fitting the intermediate carrying substrate and the target substrate under a second set pressure; and electrically connecting the micro light emitting diodes on the intermediate carrying substrate to electrodes in the corresponding sub-pixels on the target substrate at a time, so that all the sub-pixels on the target substrate receive micro light emitting diodes at a time, one micro light emitting diode on the intermediate carrying substrate corresponding to one sub-pixel on the target substrate, and the second set pressure being greater than the first set pressure.

In some examples, the intermediate carrying substrate includes a plurality of intermediate carrying regions, the intermediate carrying regions being provided with transferred micro light emitting diodes.

The target substrate includes a plurality of display regions, the display regions being provided with the sub-pixels, and one of the display regions corresponding to one of the intermediate carrying regions.

After the picking up the micro light emitting diodes on an element substrate through a transfer substrate and transferring to an intermediate carrying substrate after pickup, and before the box-aligning the intermediate carrying substrate with the target substrate under a first set pressure, the method further includes: applying a frame sealant surrounding the intermediate carrying regions to one side, provided with the micro light emitting diodes, of the intermediate carrying substrate.

The box-aligning the intermediate carrying substrate with the target substrate under a first set pressure includes:

controlling a pressure in an alignment system to be a third set pressure, and placing the intermediate carrying substrate and the target substrate into the alignment system, the third set pressure being greater than the first set pressure;

controlling the pressure in the alignment system to be the first set pressure;

controlling the intermediate carrying substrate to be aligned with the target substrate, so that micro light emitting diodes in one of the intermediate carrying regions are arranged corresponding to sub-pixels in one of the display regions; and attaching the intermediate carrying substrate to the target substrate by a first set time, so as to perform box-alignment through the frame sealant.

In some examples, the press-fitting the intermediate carrying substrate and the target substrate under a second set pressure includes:

controlling the pressure in the alignment system to be the second set pressure; and press-fitting the intermediate carrying substrate and the target substrate after a second set time.

In some examples, the press-fitting the intermediate carrying substrate and the target substrate under a second set pressure includes:

controlling the pressure in the alignment system to be an atmospheric pressure; and taking out the intermediate carrying substrate and the target substrate from the alignment system, to expose same to air, taking the atmospheric pressure as the second set pressure, and press-fitting the intermediate carrying substrate and the target substrate after a third set time.

In some examples, the first set pressure is not greater than $1.01 \times 10^3$ Pa; and/or the third set pressure is not less than $1.01 \times 10^5$ Pa.

In some examples, the second set pressure is not less than $1.01 \times 10^5$ Pa.

In some examples, an intermediate carrying adhesive layer is formed between the intermediate carrying substrate and the transferred micro light emitting diodes, a thermoplastic resin layer being formed between the intermediate carrying adhesive layer and the intermediate carrying substrate.

The electrically connecting all the micro light emitting diodes on the intermediate carrying substrate to electrodes in the corresponding sub-pixels on the target substrate at a time includes:

performing a heating treatment on the intermediate carrying substrate and target substrate which are press-fitted, to deform the thermoplastic resin layer; and filling a space formed after the intermediate carrying substrate is box-aligned with the target substrate with the thermoplastic resin layer and attaching the intermediate carrying adhesive layer to the target substrate after a set heating time, and electrically connecting the micro light emitting diodes on the intermediate carrying substrate to the electrodes in the corresponding sub-pixels on the target substrate at a time.

In some examples, the target substrate is a rigid substrate.

Alternatively, the target substrate is a flexible substrate, one side, facing away from the electrodes, of the target substrate being provided with a carrying substrate, and an intermediate carrying photo-dissociable adhesive layer is formed between the thermoplastic resin layer and the intermediate carrying substrate.

After the electrically connecting all the micro light emitting diodes on the intermediate carrying substrate to electrodes in the corresponding sub-pixels on the target substrate at a time, so that all the sub-pixels on the target substrate receive micro light emitting diodes at a time, the method further includes:

peeling off the intermediate carrying substrate from the intermediate carrying photo-dissociable adhesive layer through ultraviolet irradiation;

forming a protective film layer covering the photo-dissociable adhesive layer on the target substrate after the intermediate carrying substrate is peeled off; and peeling off the carrying substrate from the target substrate through a laser.

Embodiments of the present disclosure provide a display panel. The display panel includes:

a target substrate including display regions and a frame sealant surrounding the display regions;

an intermediate carrying adhesive layer covering the display regions, an orthographic projection, on the target substrate, of the intermediate carrying adhesive layer being positioned in an orthographic projection, on the target substrate, of the frame sealant;

a thermoplastic resin layer covering the intermediate carrying adhesive layer, an orthographic projection, on the target substrate, of the thermoplastic resin layer being positioned in an orthographic projection, on the target substrate, of the frame sealant; and a protective structure covering the thermoplastic resin layer and the frame sealant.

The display regions are provided with a plurality of sub-pixels and post spacers arranged in gaps between the sub-pixels.

Each sub-pixel including a micro light emitting diode.

In some examples, the protective structure is at least one of a protective film layer or a protective cover plate.

BRIEF DESCRIPTION OF THE DRAWINGS

FIG. 8A shows yet some other sectional schematic structural diagrams of an intermediate carrying substrate and a light control substrate according to an embodiment of the present disclosure.

FIG. 8B shows still some other sectional schematic structural diagrams of an intermediate carrying substrate and a light control substrate according to an embodiment of the present disclosure.

FIG. 9 shows some other top-view schematic structural diagrams of a transfer substrate according to an embodiment of the present disclosure.

DETAILED DESCRIPTION OF THE EMBODIMENTS

Figure 1:
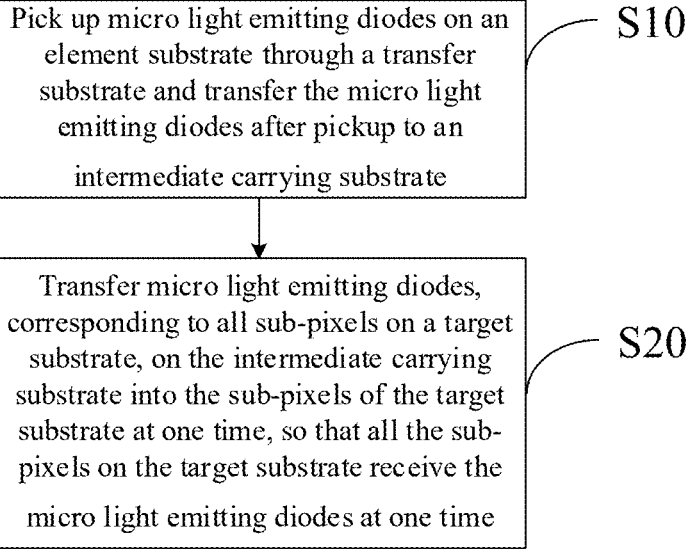
FIG. 1 is a flowchart of a mass transfer method according to an embodiment of the present disclosure.

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. Apparently, the described embodiments are some embodiments rather than all embodiments of the present disclosure. Moreover, the embodiments in the present disclosure and features in the embodiments can be combined mutually without conflict. Based on the described embodiments of the present disclosure, all other embodiments derived by those of ordinary skill in the art without creative efforts fall within the scope of protection of the present disclosure.

Unless otherwise defined, technical or scientific terms used in the present disclosure should have ordinary meanings understood by those of ordinary skill in the art to which the present disclosure belongs. Words "first", "second", etc. used in the present disclosure do not denote any order, quantity, or importance, but are merely used to distinguish between different components. Words "comprise", "include", etc. mean that elements or items before the word encompass elements or items listed after the word and their equivalents, but do not exclude other elements or items. Words "connection", "connected", etc. are not restricted to physical or mechanical connections, but can include direct or indirect electrical connections.

It is to be noted that sizes and shapes of all graphs in the accompanying drawings do not reflect true scales, and are merely to illustrate contents of the present disclosure. Moreover, the same or similar reference numerals denote the same or similar elements or elements having the same or similar function throughout.

A manufacturing process for micro light emitting diodes W includes: firstly, structures of light emitting diodes are covered with thin films, and are miniaturized and arrayed, so as to obtain a size of only 1 micron-100 microns or so; then the micro light emitting diodes W are transferred to a circuit substrate in batches; and finally, the circuit substrate with the micro light emitting diodes is encapsulated. How to realize batch transfer is critical to this process, which makes a mass transfer technology emerge. According to the mass transfer technology, micro light emitting diodes W formed on an element substrate 200 are transferred to a circuit substrate in batches. Each micro light emitting diode W corresponds to one sub-pixel on the circuit substrate. Since the micro light emitting diodes W are small-sized, and millions of sub-pixels are required on the circuit substrate, the technical problem of how to selectively transfer the manufactured micro light emitting diodes W to the circuit substrate in batches with a high efficiency and a low cost is to be solved by those skilled in the art immediately at present.

In view of that, embodiments of the present disclosure provide some mass transfer methods for micro light emitting diodes W, so as to improve a transfer efficiency.

Embodiments of the present disclosure provide a mass transfer method for micro light emitting diodes. As shown in FIG. 1, the mass transfer method may include the following steps.

S10, the micro light emitting diodes on an element substrate are picked up through a transfer substrate and transferred to an intermediate carrying substrate after pickup.

S20, micro light emitting diodes, corresponding to all sub-pixels on a target substrate, on the intermediate carrying substrate are transferred into the sub-pixels of the target substrate at one time, so that the micro light emitting diodes are received by all the sub-pixels on the target substrate at one time.

According to the mass transfer method for micro light emitting diodes W according to the embodiments of the present disclosure, the micro light emitting diodes W on the element substrate 200 are picked up through the transfer substrate 300 and transferred to the intermediate carrying substrate 400 after pickup, so as to transfer the micro light emitting diodes W on the element substrate 200 to the intermediate carrying substrate 400, thereby improving an efficiency. Moreover, the micro light emitting diodes W on the intermediate carrying substrate 400 are transferred into the corresponding sub-pixels on the target substrate 100, so that the micro light emitting diodes W are received by all the sub-pixels on the target substrate 100 at a time without additional repeated transfer, thereby improving the efficiency.

Figure 2A:
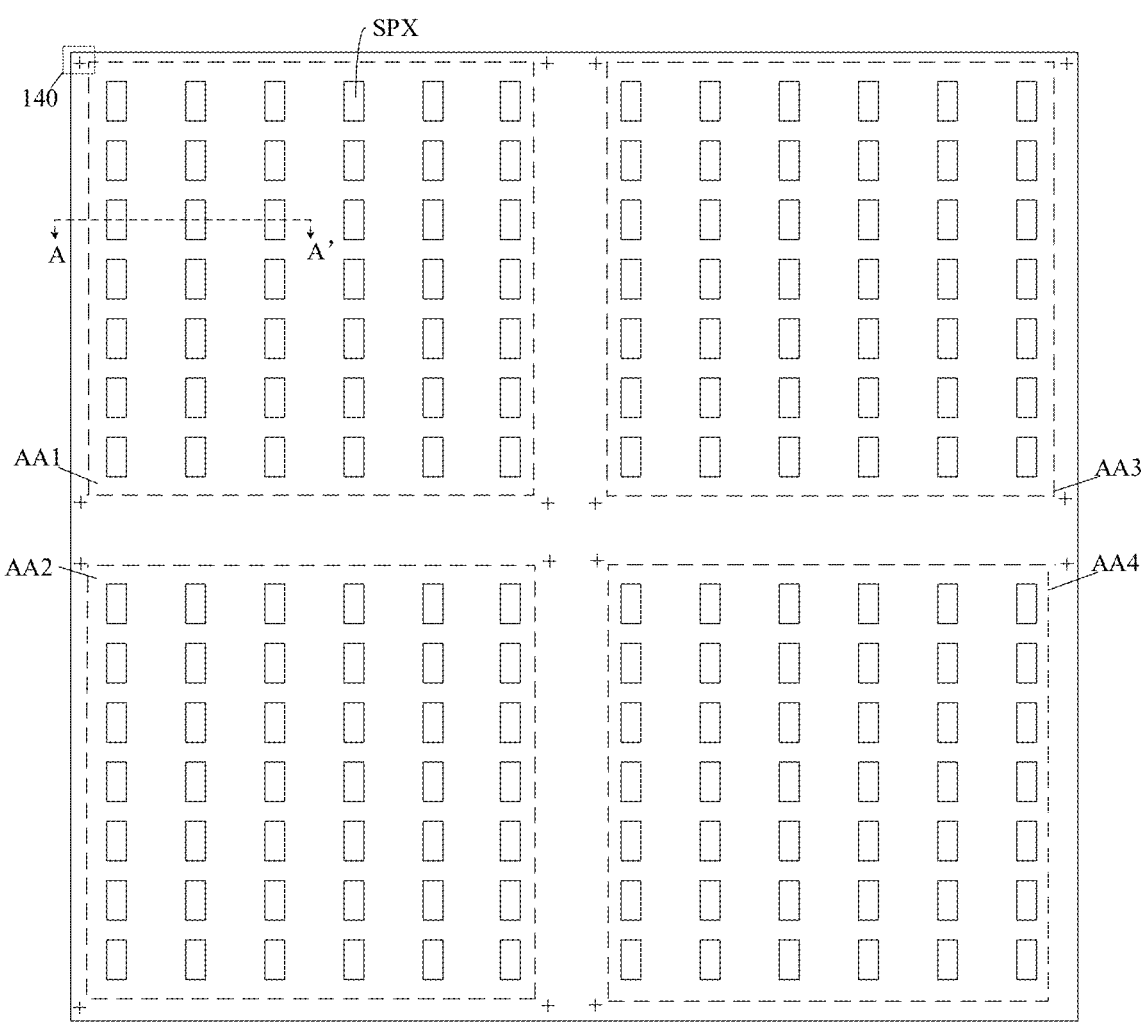
FIG. 2A is a top-view schematic structural diagram of a target substrate according to an embodiment of the present disclosure.
Figure 2B:
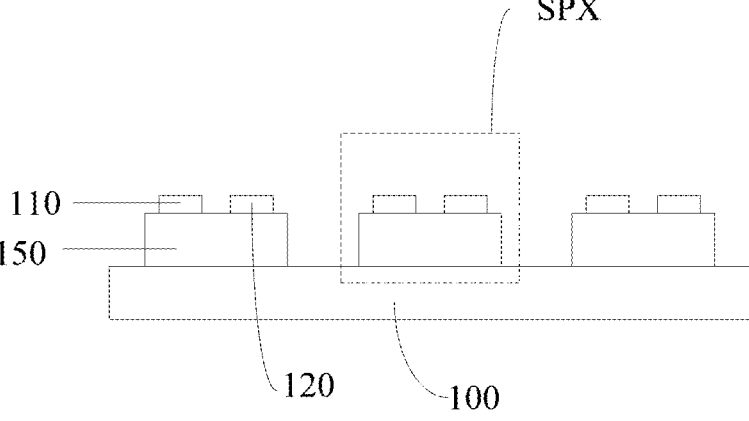
FIG. 2B is a sectional schematic structural diagram along AA' of the target substrate shown in FIG. 2A.

Typically, the target substrate 100 is applied to form a display panel, so as to make the display panel realize a display function. During implementations, as shown in FIGS. 2A and 2B, the target substrate 100 may include a plurality of display regions (for example, AA1, AA2, AA3, and AA4). Each display region includes a plurality of pixel units distributed in an array. Each pixel unit may include a plurality of sub-pixels SPX. The sub-pixels in the target substrate 100 are distributed in an array. Typically, a driving circuit is formed on a base substrate to form a circuit substrate through a thin film transistor (TFT) manufacturing process. In this way, after being transferred into the sub-pixels of the circuit substrate, the micro light emitting diodes W may be driven by the driving circuit to emit light. During implementations, in embodiments of the present disclosure, the target substrate 100 may be the circuit substrate. As shown in FIG. 2B, each sub-pixel on the target substrate 100 may include a pre-formed driving circuit 150, and a first electrode 110 and a second electrode 120 which are both electrically connected to the driving circuit 150. A positive electrode of the micro light emitting diode W may be electrically connected to the first electrode 110, and a negative electrode of the micro light emitting diode W may be electrically connected to the second electrode 120. Therefore, the driving circuit 150 inputs a voltage or a current into the electrically-connected micro light emitting diode W through the first electrode 110 and the second electrode 120, so that the driving circuit 150 drives the micro light emitting diode W to emit light.

Figure 3A:
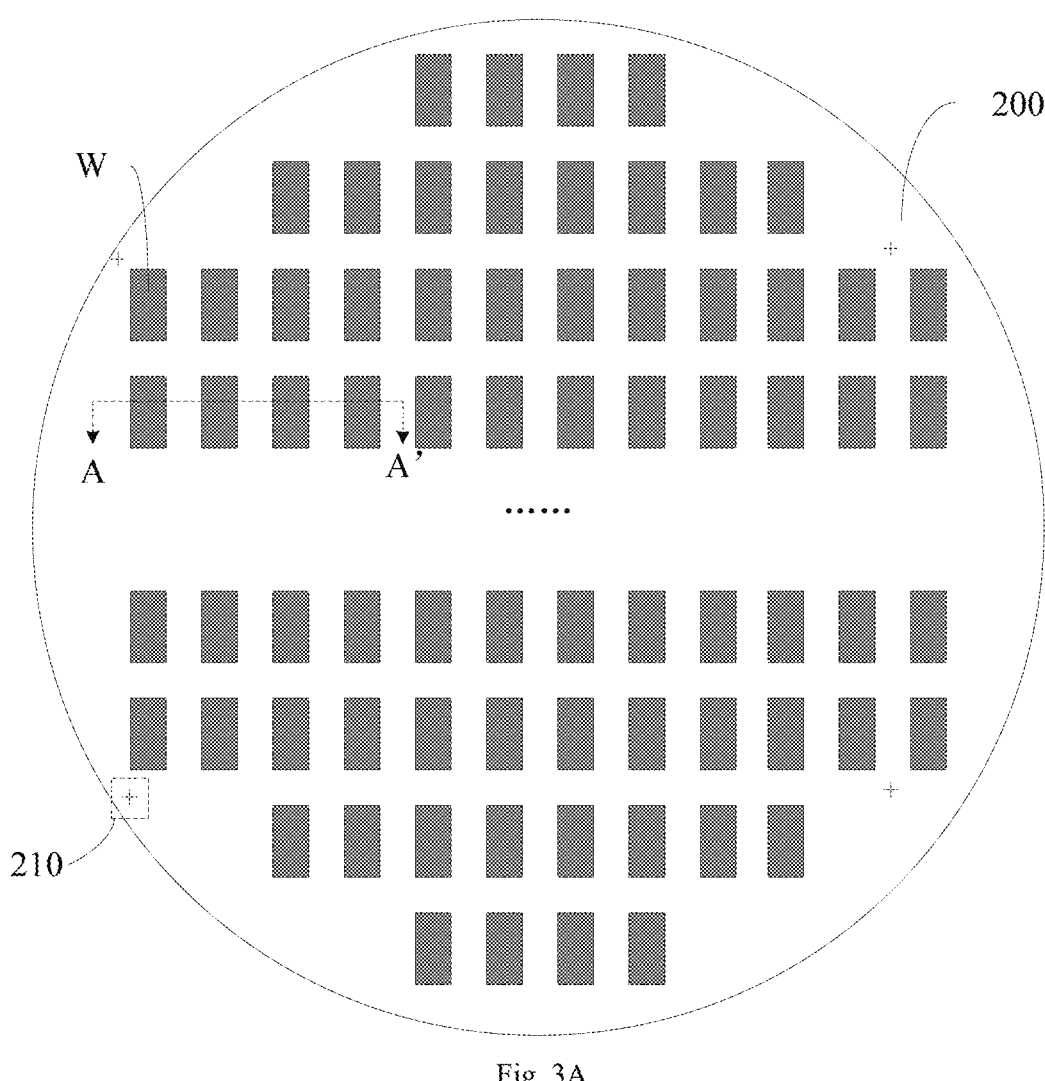
FIG. 3A is a top-view schematic structural diagram of an element substrate according to an embodiment of the present disclosure.
Figure 3B:
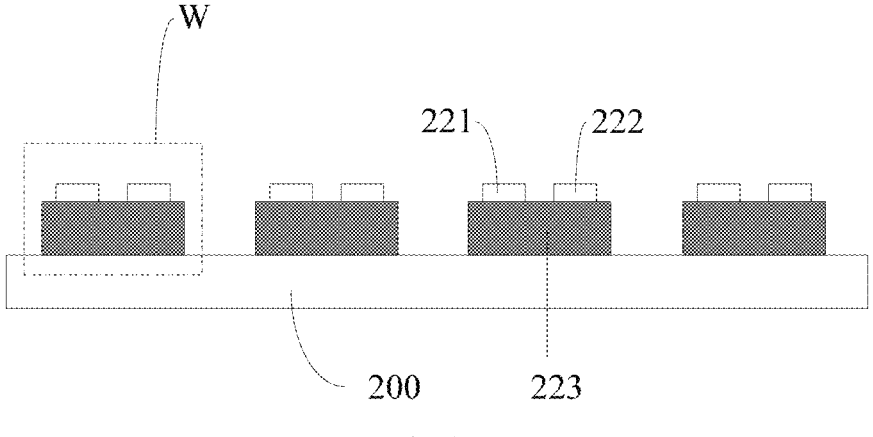
FIG. 3B is a sectional schematic structural diagram along AA' of the element substrate shown in FIG. 3A.

During implementations, in embodiments of the present disclosure, a plurality of micro light emitting diodes W formed on the element substrate 200 may be distributed in an array, and one micro light emitting diode W of the element substrate 200 corresponds to one sub-pixel of the target substrate 100. Exemplarily, as shown in FIGS. 3A and 3B, each micro light emitting diode W may be provided with a positive electrode 221, a negative electrode 222, and a light emitting chip body 223. Exemplarily, the element substrate 200 may be smaller than the target substrate 100 in size. The plurality of micro light emitting diodes W distributed in the array may be formed on the element substrate 200. Exemplarily, the element substrate 200 may be one of a wafer, a blue film, and a sapphire substrate. Exemplarily, as shown in FIG. 3A, the wafer is generally circular in shape, and all the micro light emitting diodes W are distributed on the wafer in the array. Further, in applications, the element substrate 200 may also be a substrate made of other types of materials, which is required to be designed and determined according to practical application environments, and will not be limited herein.

Figure 4A:
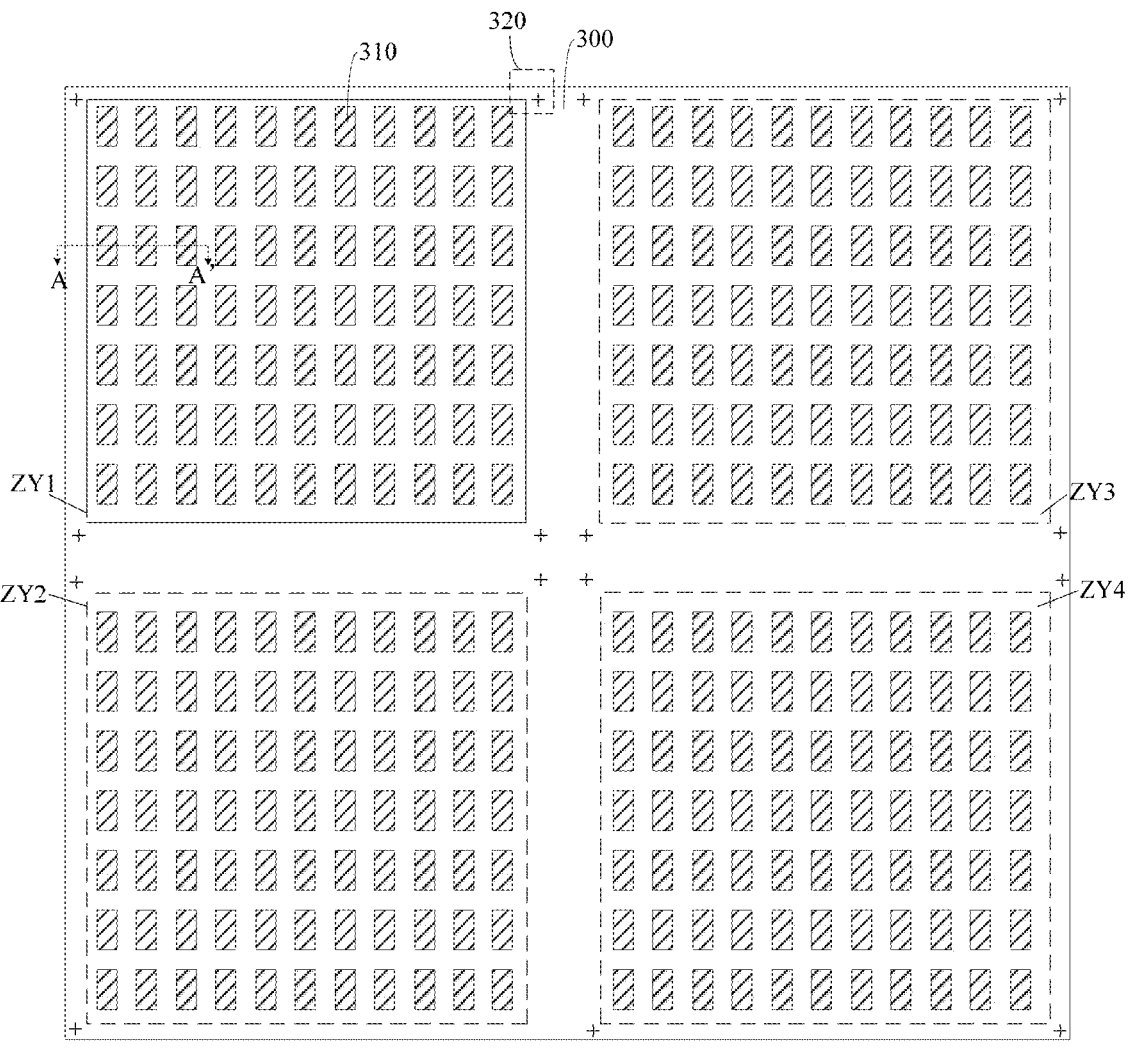
FIG. 4A is a top-view schematic structural diagram of a transfer substrate according to an embodiment of the present disclosure.
Figure 4B:
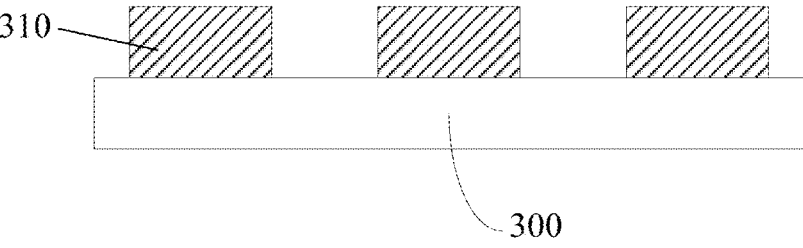
FIG. 4B shows some sectional schematic structural diagrams along AA' of the transfer substrate shown in FIG. 4A.

During implementations, as shown in FIGS. 4A and 4B, the transfer substrate 300 may be block-shaped, for example, rectangular or square. Further, the transfer substrate 300 may be larger than the element substrate 200 in size. The transfer substrate 300 may have the same size as the target substrate 100. In embodiments of the present disclosure, as shown in FIG. 4A, the transfer substrate 300 may include a plurality of transfer regions. For example, as shown in FIG. 4A, the transfer substrate 300 includes four transfer regions: ZY1, ZY2, ZY3, and ZY4. Further, in practical applications, the transfer substrate 300 may also have 8, 16, 20, or more transfer regions, which may be designed and determined according to requirements of the practical applications, and will not be limited herein.

During implementations, as shown in FIGS. 4A and 4B, an orthographic projection, on one element substrate 200, of one transfer region may be positioned in the one element substrate 200. Exemplarily, the orthographic projection, on the element substrate 200, of one transfer region may coincide with a largest region, where micro light emitting diodes W satisfying quality requirements are positioned, formed on the element substrate 200.

Figure 4C:
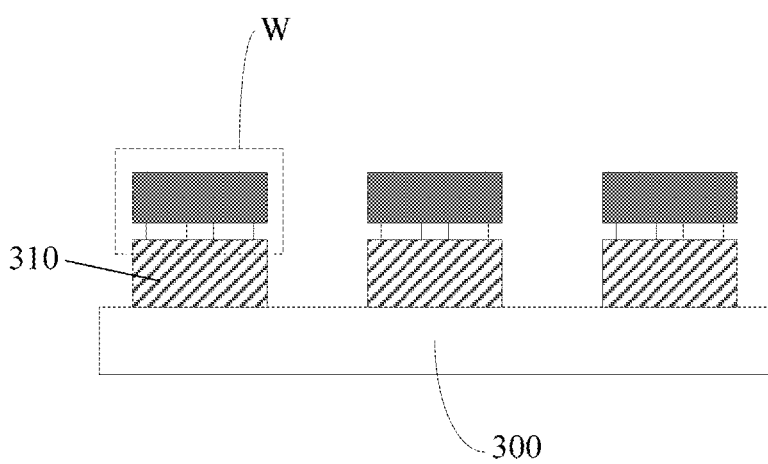
FIG. 4C shows some other sectional schematic structural diagrams along AA' of the transfer substrate shown in FIG. 4A.

During implementations, as shown in FIGS. 4A and 4B, a plurality of bonding structures 310 distributed in an array may be formed on each of the transfer regions (for example, ZY1, ZY2, ZY3, and ZY4) of the transfer substrate 300. Moreover, a distance between adjacent bonding structures 310 is set according to a distance between adjacent micro light emitting diodes W on the element substrate 200, so that one bonding structure 310 may correspond to one micro light emitting diode W of the element substrate 200. Exemplarily, the bonding structure 310 may be a photo-dissociable adhesive, for example, an ultraviolet photo-dissociable adhesive. Exemplarily, as shown in FIG. 4C, the bonding structures 310 in the transfer region are configured to bond the micro light emitting diodes W on the element substrate 200 in a one-to-one corresponding manner. In other words, the bonding structures arranged in the transfer region may bond the corresponding micro light emitting diodes W of the element substrate 200 at one time.

During implementations, as shown in FIGS. 4A and 4B, one transfer region of the transfer substrate 300 may correspond to one display region of the target substrate 100. For example, transfer region ZY1 of the transfer substrate 300 may correspond to display region AA1 of the target substrate 100, transfer region ZY2 of the transfer substrate 300 may correspond to display region AA2 of the target substrate 100, transfer region ZY3 of the transfer substrate 300 may correspond to display region AA3 of the target substrate 100, and transfer region ZY4 of the transfer substrate 300 may correspond to display region AA4 of the target substrate 100.

Figure 5A:
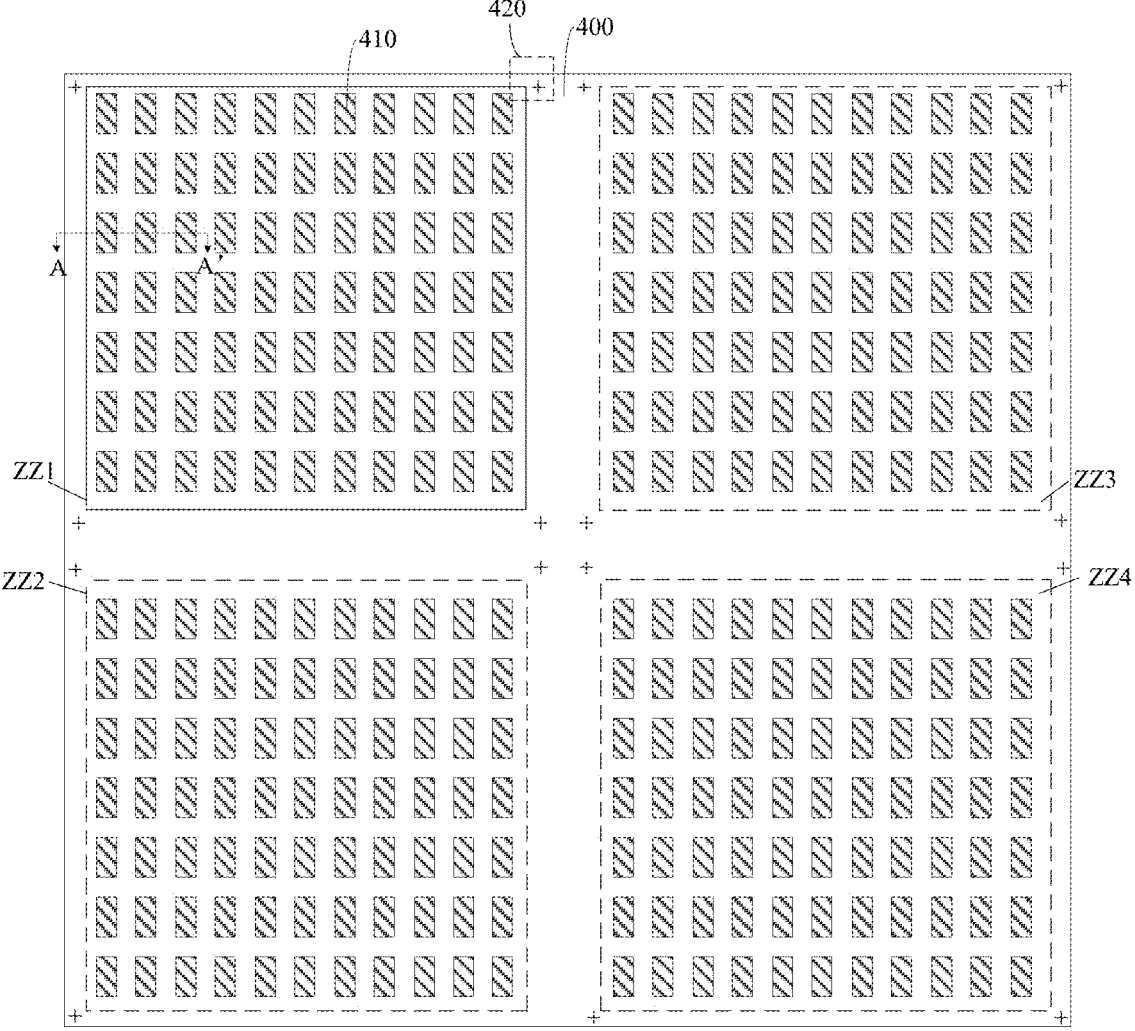
FIG. 5A is a top-view schematic structural diagram of an intermediate carrying substrate according to an embodiment of the present disclosure.
Figures 5B, 5C:
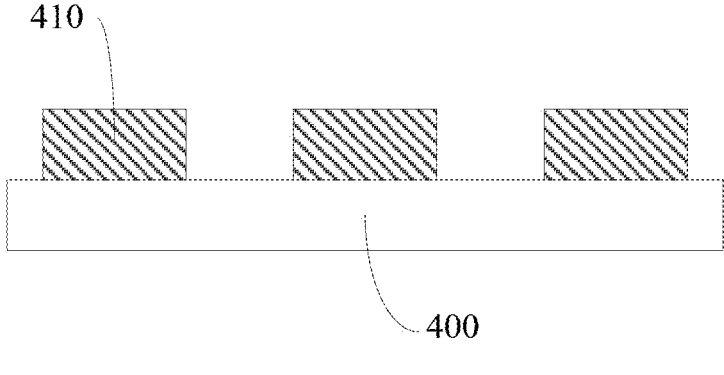
FIG. 5B shows some sectional schematic structural diagrams along AA' of the intermediate carrying substrate shown in FIG. 5A.
FIG. 5C shows some other sectional schematic structural diagrams along AA' of the intermediate carrying substrate shown in FIG. 5A.

During implementations, as shown in FIGS. 5A and 5B, the intermediate carrying substrate 400 may be block-shaped, for example, rectangular or square. Further, the intermediate carrying substrate 400 may have substantially the same size as the transfer substrate 300. In embodiments of the present disclosure, as shown in FIG. 5A, the intermediate carrying substrate 400 may include a plurality of intermediate carrying regions. For example, as shown in FIG. 5A, the intermediate carrying substrate 400 includes four intermediate carrying regions: ZZ1, ZZ2, ZZ3, and ZZ4. Further, in practical applications, the intermediate carrying substrate 400 may also have 8, 16, 20, or more intermediate carrying regions, which may be designed and determined according to requirements of the practical applications, and will not be limited herein.

During implementations, as shown in FIGS. 5A and 5B, a plurality of bonding receiving structures 410 distributed in an array may be formed on each of the intermediate carrying regions (for example, ZZ1, ZZ2, ZZ3, and ZZ4) of the intermediate carrying substrate 400. One bonding receiving structure 410 corresponds to one bonding structure 310 on the transfer substrate 300. Exemplarily, the bonding receiving structure 410 may be a photo-dissociable adhesive, for example, an ultraviolet photo-dissociable adhesive.

During implementations, in embodiments of the present disclosure, one transfer region on the transfer substrate 300 may correspond to one intermediate carrying region on the intermediate carrying substrate 400. Exemplarily, as shown in FIGS. 4A and 5A, transfer region ZY1 on the transfer substrate 300 corresponds to intermediate carrying region ZZ1 on the intermediate carrying substrate 400, that is, display region AA1 corresponds to intermediate carrying region ZZ1. Transfer region ZY2 on the transfer substrate 300 corresponds to intermediate carrying region ZZ2 on the intermediate carrying substrate 400, that is, display region AA2 corresponds to intermediate carrying region ZZ2. Transfer region ZY3 on the transfer substrate 300 corresponds to intermediate carrying region ZZ3 on the intermediate carrying substrate 400, that is, display region AA3 corresponds to intermediate carrying region ZZ3. Transfer region ZY4 on the transfer substrate 300 corresponds to intermediate carrying region ZZ4 on the intermediate carrying substrate 400, that is, display region AA4 corresponds to intermediate carrying region ZZ4.

Exemplarily, the transfer substrate 300 and the intermediate carrying substrate 400 may be glass substrates. Further, in practical applications, the transfer substrate 300 may also be a substrate made of other types of materials, which will not be limited herein.

During implementations, in embodiments of the present disclosure, a distance between two adjacent intermediate carrying regions equals an integer multiple of a width of one micro light emitting diode W on the element substrate 200. For example, the distance between two adjacent intermediate carrying regions equals one, two, five, or more multiples of the width of one micro light emitting diode W on the element substrate 200, which may be designed and determined according to requirements of the practical applications, and will not be limited herein.

During implementations, in embodiments of the present disclosure, a distance between the sub-pixels of the target substrate 100 equals an integer multiple of the width of one micro light emitting diode W on the intermediate carrying substrate 400. For example, the distance between the sub-pixels of the target substrate 100 equals one, two, five, or more multiples of the width of one micro light emitting diode W on the intermediate carrying substrate 400, which may be designed and determined according to requirements of actual applications, and will not be limited herein.

During implementations, in embodiments of the present disclosure, a light control substrate is formed on one side, facing away from transferred micro light emitting diodes W, of the intermediate carrying substrate 400. The light control substrate is provided with a plurality of light control regions arranged at intervals. An orthographic projection, on the intermediate carrying substrate 400, of one light control region covering an orthographic projection, on the intermediate carrying substrate 400, of one micro light emitting diode W on the intermediate carrying substrate 400. For example, as shown in FIG. 5C, the orthographic projection, on the intermediate carrying substrate 400, of one light control region covers an orthographic projection, on the intermediate carrying substrate 400, of one bonding receiving structure 410 on the intermediate carrying substrate 400.

Figure 5D:
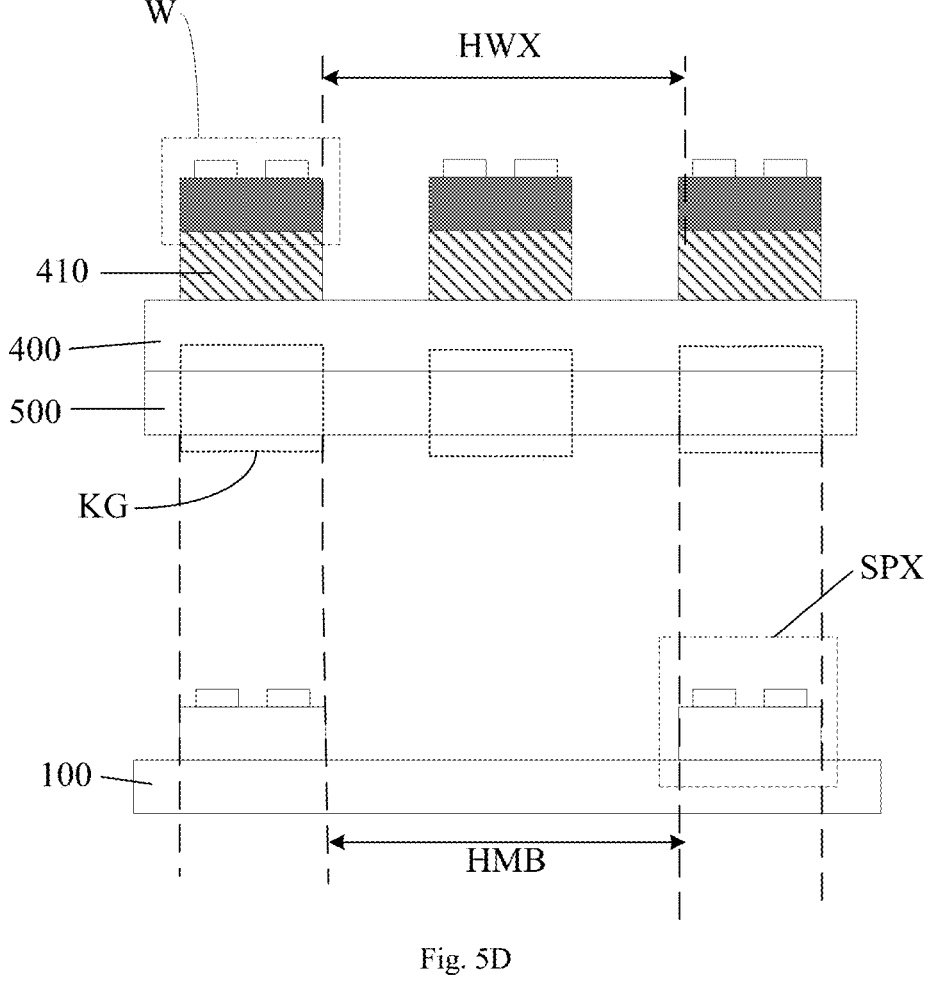
FIG. 5D shows yet some other sectional schematic structural diagrams along AA' of the intermediate carrying substrate shown in FIG. 5A.

During implementations, in embodiments of the present disclosure, a gap between two adjacent sub-pixels in the target substrate 100 covers at least one micro light emitting diode W. For example, as shown in FIG. 5D, the gap between two adjacent sub-pixels in the target substrate 100 may cover one micro light emitting diode W bonded on the intermediate carrying substrate 400. Alternatively, the gap between two adjacent sub-pixels in the target substrate 100 may cover two, three, four, or more micro light emitting diodes W. In practical applications, such an arrangement may be designed and determined according to requirements of the practical applications, which will not be limited herein.

During implementations, in embodiments of the present disclosure, as shown in FIG. 5D, the distance HMB between two adjacent sub-pixels in the target substrate 100 may be set to equal an integral multiple of a distance HWX between two micro light emitting diodes W bonded on the intermediate carrying substrate 400 and sandwiching one micro light emitting diode W. For example, as shown in FIG. 5D, the distance HMB between two adjacent sub-pixels in the target substrate 100 may be set to equal one multiple of the distance HWX between two micro light emitting diodes W bonded on the intermediate carrying substrate 400 and sandwiching one micro light emitting diode W. Further, in practical applications, the distance HMB between two adjacent sub-pixels in the target substrate 100 may be set to equal two, three, four, or more multiples of the distance HWX between two micro light emitting diodes W bonded on the intermediate carrying substrate 400 and sandwiching one micro light emitting diode W, which may be designed and determined according to requirements of the practical applications, and will not be limited herein.

Exemplarily, the light control substrate may be a liquid crystal display (LCD). Typically, the liquid crystal display includes an array substrate and an opposite substrate arranged opposite each other, and a liquid crystal layer encapsulated between the opposite substrate and the array substrate. The liquid crystal display is provided with a plurality of display pixels, and the light control regions may be display pixels. Exemplarily, TFTs and pixel electrodes positioned in the display pixels are arranged on the array substrate, and common electrodes are arranged on the opposite substrate. In this way, liquid crystal molecules in the liquid crystal layer may be driven to flip through an electric field generated between the pixel electrodes and the common electrodes, so that the display pixels in the liquid crystal display transmit light. Exemplarily, the liquid crystal display is not provided with a color filter layer, so that the liquid crystal display may be a black-and-white liquid crystal display.

In some examples, as shown in FIG. 5D, in step S20 that micro light emitting diodes W, corresponding to all sub-pixels on a target substrate, on the intermediate carrying substrate are transferred into the sub-pixels of the target substrate at a time, the corresponding light emitting diodes mentioned may be micro light emitting diodes, that may be electrically connected to the driving circuits of the sub-pixels (SPX) in the target substrate 100, on an intermediate carrying substrate 500. For example, a plurality of micro light emitting diodes W are arranged on the intermediate carrying substrate 500. However, these micro light emitting diodes W do not correspond one-to-one to the sub-pixels on the target substrate, and some of these micro light emitting diodes W arranged on the intermediate carrying substrate 500 may correspond one-to-one to the sub-pixels on the target substrate 100, so that the some of these micro light emitting diodes W on the intermediate carrying substrate 500 may be transferred to the sub-pixels SPX of the target substrate 100 at a time. Therefore, the micro light emitting diodes W are received by all the sub-pixels SPX on the target substrate 100 at a time. After this transfer, certain micro light emitting diodes W may remain on the intermediate carrying substrate 500 for a next transfer process.

Figure 6A:
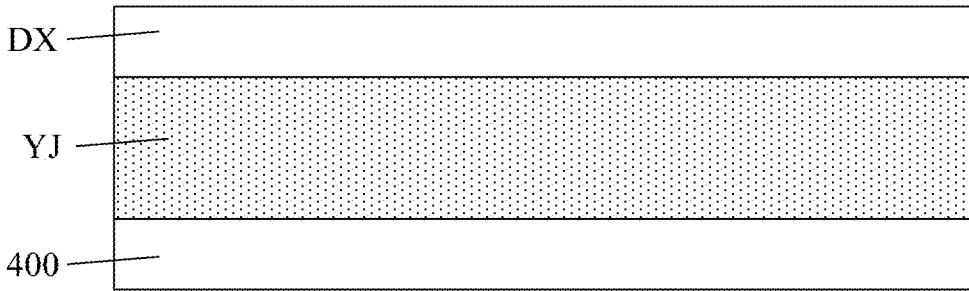
FIG. 6A shows some sectional schematic structural diagrams of an intermediate carrying substrate and a light control substrate according to an embodiment of the present disclosure.

In some examples, as shown in FIG. 6A, the intermediate carrying substrate 400 serves as the base substrate of the array substrate of the liquid crystal display. That is, the intermediate carrying substrate 400 may be taken as a base substrate of the array substrate, to encapsulate the liquid crystal layer YJ along with the opposite substrate DX. In other words, an entire liquid crystal display is used as the intermediate carrying substrate 400.

Figure 6B:
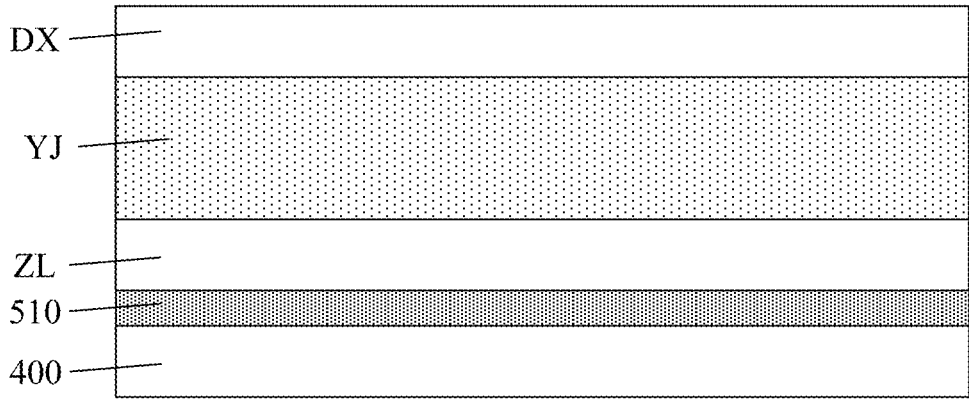
FIG. 6B shows some other sectional schematic structural diagrams of an intermediate carrying substrate and a light control substrate according to an embodiment of the present disclosure.

In some examples, as shown in FIG. 6B, the intermediate carrying substrate 400 may also be positioned on one side, facing away from the liquid crystal layer YJ, of the array substrate ZL of the liquid crystal display, and a bonding layer 510 is formed between the intermediate carrying substrate 400 and the array substrate ZL. In this way, the intermediate carrying substrate 400 may be arranged on one side of the liquid crystal display through the bonding layer 510. Exemplarily, the bonding layer 510 may be a photo-dissociable adhesive, for example, an ultraviolet photo-dissociable adhesive.

In some examples, during implementations, the step that the micro light emitting diodes W on an element substrate 200 are picked up through a transfer substrate 300 and transferred to an intermediate carrying substrate 400 after pickup may include following steps.

All the micro light emitting diodes W, corresponding to the transfer region, on the element substrate 200 are picked up through the transfer substrate 300.

The micro light emitting diodes W on the transfer substrate 300 are transferred to the intermediate carrying substrate 400 at a time.

In some examples, during implementations, the step that micro light emitting diodes W, corresponding to all sub-pixels on a target substrate 100, on the intermediate carrying substrate 400 are transferred into the sub-pixels of the target substrate 100 at a time, so that the micro light emitting diodes W are received by all the sub-pixels on the target substrate 100 at a time may include following steps.

The intermediate carrying substrate 400 is aligned with the target substrate 100.

Light control regions corresponding to all the sub-pixels of the target substrate 100, of the light control substrate are controlled to transmit light, and other light control regions are controlled to shield light.

Micro light emitting diodes W, corresponding to light-transmitting light control regions, on the intermediate carrying substrate 400 are separated from the intermediate carrying substrate 400 through laser irradiation, to transfer the micro light emitting diodes W on the intermediate carrying substrate 400 into the sub-pixels on the target substrate 100, so that the micro light emitting diodes W are received by all the sub-pixels on the target substrate 100 at a time.

A process of the mass transfer method is described below with reference to embodiments, but it should be understood that a specific process is not limited thereto.

The mass transfer method for micro light emitting diodes W according to embodiments of the present disclosure may include following steps.

(1) A plurality of wafers 200 provided with the micro light emitting diodes W distributed in an array are provided, as shown in FIGS. 3A and 3B.

(2) All the micro light emitting diodes W, corresponding to the transfer region, on the element substrate 200 are picked up through the transfer substrate 300.

Exemplarily, firstly, one transfer region (for example, ZY1) of the transfer substrate 300 is aligned with one wafer 200 for bonding. As shown in FIGS. 3A, 4A, 7A and 7B, transfer alignment marks 320 may be provided at four corners of each transfer region of the transfer substrate 300. The wafer 200 is also provided with element alignment marks 210. In this way, the transfer alignment marks 320 may be controlled to be aligned with the element alignment marks 210, so that the bonding structures 310 on the transfer substrate 300 may be aligned with the micro light emitting diodes W on the wafers 200 in a one-to-one corresponding manner. After alignment, the aligned bonding structures 310 on the transfer substrate 300 are bonded to the micro light emitting diodes W on the wafers 200 in a one-to-one corresponding manner, so that the bonding structures 310 are bonded to the micro light emitting diodes W.

Then through a thermal curing process, the wafers 200 may be separated from the micro light emitting diodes W thereon, and the bonding structures 310 are bonded to the micro light emitting diodes W more firmly. Accordingly, transfer region ZY1 of the transfer substrate 300 picks up the bonded micro light emitting diodes W.

The process described above is repeated, so that transfer regions ZY2, ZY3 and ZY4 of the transfer substrate 300 pick up the bonded micro light emitting diodes W.

(3) The micro light emitting diodes W on the transfer substrate 300 are transferred to the intermediate carrying substrate 400 at a time.

Figure 7A:
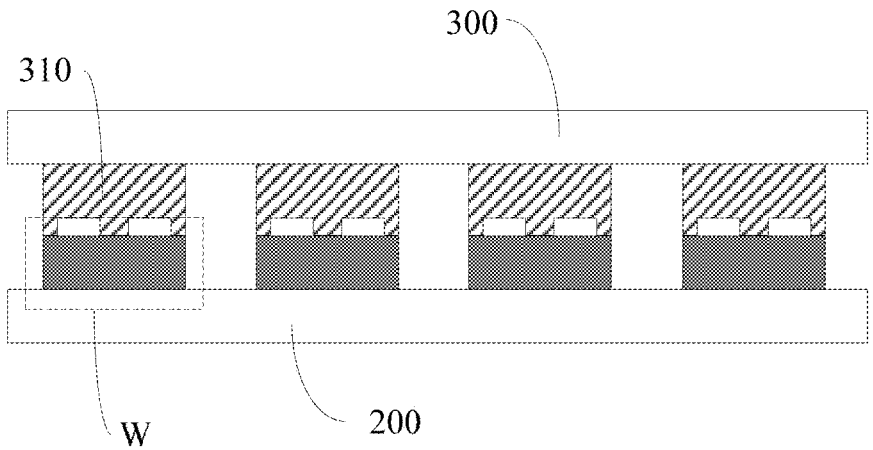
FIGS. 7A-7F are schematic structural diagrams in respective steps of some mass transfer methods according to embodiments of the present disclosure.
Figure 7B:
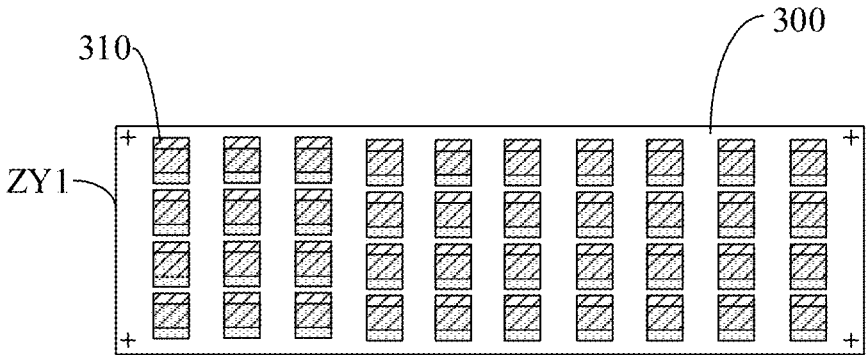
Figure 7B:
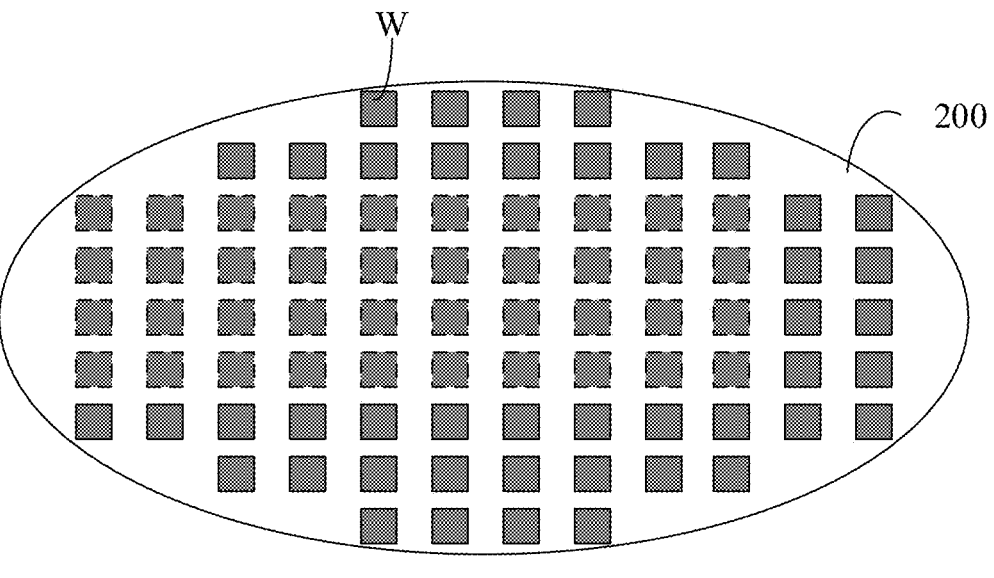
Figure 7C:
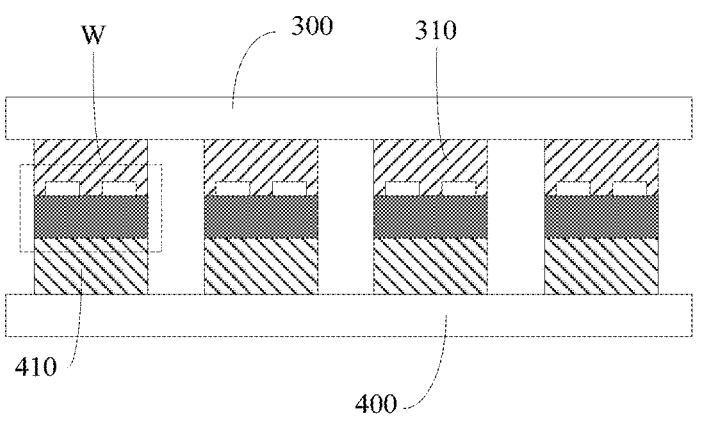

For example, firstly, the transfer substrate 300 is aligned with the intermediate carrying substrate 400. As shown in FIGS. 4A, 5A, and 7C intermediate carrying alignment marks 420 may be arranged at four corners of the intermediate carrying regions of the intermediate carrying substrate 400. In this way, the transfer alignment marks 320 may be controlled to be aligned with the intermediate carrying alignment marks 420, so that the micro light emitting diodes W on the transfer substrate 300 may be aligned with the bonding receiving structures, corresponding to the micro light emitting diodes W, on the intermediate carrying substrate 400 in a one-to-one corresponding manner. After alignment, the micro light emitting diodes W bonded on the transfer substrate 300 are bonded to the bonding receiving structures, corresponding to the micro light emitting diodes W, on the intermediate carrying substrate 400 in a one-to-one corresponding manner, so that the micro light emitting diodes W are bonded to all the bonding receiving structures 410 on the intermediate carrying substrate 400.

Figure 7D:
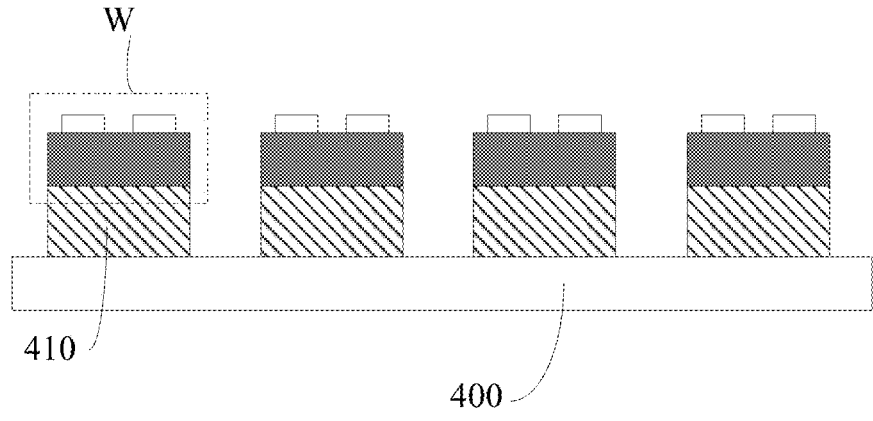

As shown in FIGS. 7C and 7D, one side, facing away from the intermediate carrying substrate 400, of the transfer substrate 300 is irradiated with ultraviolet, so as to separate the micro light emitting diodes W from the bonding structures 310. Therefore, the intermediate carrying substrate 400 picks up the bonded micro light emitting diodes W. That is, all the micro light emitting diodes W on the transfer substrate 300 are transferred to the intermediate carrying substrate 400.

It is to be noted that the micro light emitting diodes W bonded on the transfer substrate 300 have the same quantity as the micro light emitting diodes W transferred from the transfer substrate 300. That is, the micro light emitting diodes W bonded in transfer region ZY1 have the same quantity as the micro light emitting diodes W transferred to intermediate carrying region ZZ1, the micro light emitting diodes W bonded in transfer region ZY2 have the same quantity as the micro light emitting diodes W transferred to intermediate carrying region ZZ2, the micro light emitting diodes W bonded in transfer region ZY3 have the same quantity as the micro light emitting diodes W transferred to intermediate carrying region ZZ3, and the micro light emitting diodes W bonded in transfer region ZY4 have the same quantity as the micro light emitting diodes W transferred to intermediate carrying region ZZ4.

(4) The intermediate carrying substrate 400 is aligned with the target substrate 100 for attachment.

Figure 7E:
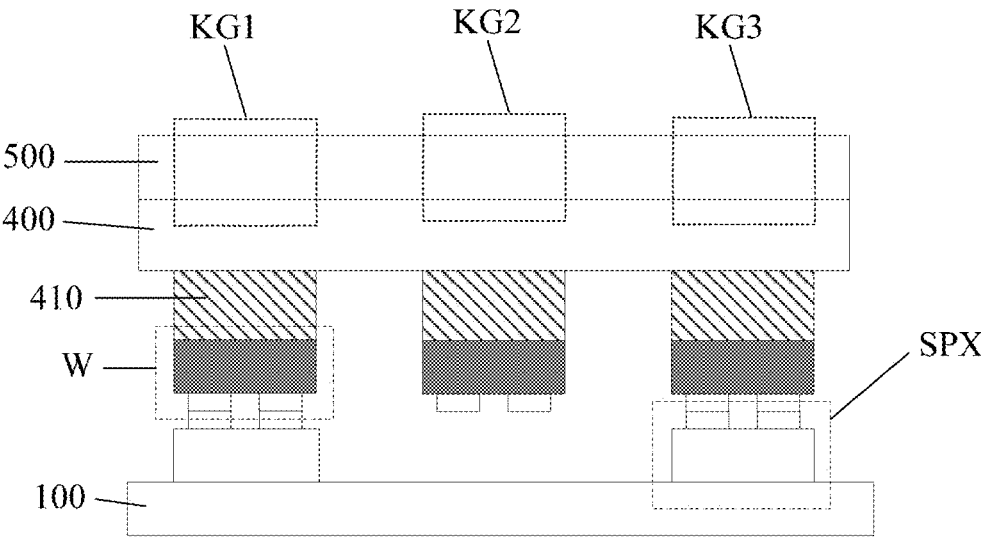

Exemplarily, the intermediate carrying substrate 400 is aligned with the target substrate 100. As shown in FIGS. 2A, 5A, and 7E, the target substrate 100 is provided with target alignment marks 140. In this way, the intermediate carrying alignment marks 420 may be controlled to be aligned with the target alignment marks 140, so that one sub-pixel SPX in display region AA1 on the target substrate 100 is aligned with one micro light emitting diode W bonded in intermediate carrying region ZZ1 of the intermediate carrying substrate 400 in a one-to-one corresponding manner. After alignment, the aligned micro light emitting diodes W on the intermediate carrying substrate 400 are attached to the first electrodes and the second electrodes in the corresponding sub-pixels of the target substrate 100 in a one-to-one corresponding manner.

It is to be noted that the sub-pixels SPX in display region AA1 may have a less quantity than the micro light emitting diodes W bonded in intermediate carrying region ZZ1. A distance between adjacent sub-pixels SPX in display region AA1 may be set, so that micro light emitting diodes W bonded in intermediate carrying region ZZ1 and sandwiching one micro light emitting diode W correspond to the adjacent sub-pixels SPX in display region AA1.

(5) The light control regions, corresponding to all the sub-pixels of the target substrate 100, of the light control substrate are controlled to transmit light, and other light control regions are controlled to shield light.

Exemplarily, as shown in FIG. 7E, light control region KG1 of the light control substrate corresponds to one sub-pixel, light control region KG3 corresponds to another sub-pixel, and light control region KG2 does not correspond to a sub-pixel. Therefore, light control regions KG1 and KG3 of the light control substrate may be controlled to transmit light, and light control region KG2 may be controlled to shield light. That is, when the light control substrate is set as the liquid crystal display, the liquid crystal molecules in the display pixels in the liquid crystal display may be controlled to flip, so that display pixels serving as light control regions KG1 and KG2 transmit light, and display pixels serving as light control region KG2 shield light.

(6) The micro light emitting diodes W, corresponding to the light-transmitting light control regions, on the intermediate carrying substrate 400 are separated from the intermediate carrying substrate 400 through laser irradiation, so as to transfer the micro light emitting diodes W on the intermediate carrying substrate 400 into the sub-pixels on the target substrate 100, so that the micro light emitting diodes W are received by all the sub-pixels on the target substrate 100 at a time.

Figure 7F:
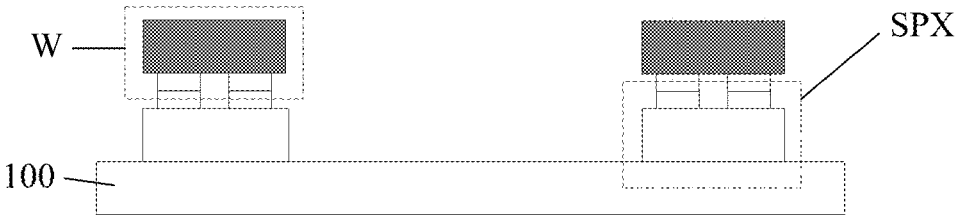

Exemplarily, as shown in FIGS. 7E and 7F, one side, facing away from the target substrate 100, of the intermediate carrying substrate 400 is irradiated with a laser, to remove adhesion of the bonding receiving structures 410, so as to separate the intermediate carrying substrate 400 from the micro light emitting diodes W, corresponding to the light-transmitting light control regions (for example, KG1 and KG3), on the intermediate carrying substrate 400, without separating the intermediate carrying substrate 400 from the micro light emitting diodes W, corresponding to a light-shielding light control region (for example, KG2), on the intermediate carrying substrate 400. Therefore, the micro light emitting diodes W on the intermediate carrying substrate 400 are transferred into the sub-pixels on the target substrate 100, so that the micro light emitting diodes W are received by all the sub-pixels on the target substrate 100 at a time.

The micro light emitting diodes W remaining on the intermediate carrying substrate 400 may also be transferred to another target substrate 100, thereby reducing a time consumed for transfer, and improving a transfer efficiency.

Embodiments of the present disclosure provide some other mass transfer methods for micro light emitting diodes W, which makes variations to the implementation mode in the embodiments described above. Only the differences between the following embodiments and the embodiments described above are described below, and the similarities therebetween will not be repeated herein.

Exemplarily, as shown in FIG. 8A, a lens layer is formed on one side, facing the intermediate carrying substrate 400, of the liquid crystal layer of the liquid crystal display. The lens layer includes a plurality of lens structures 610. An orthographic projection, on the intermediate carrying substrate 400, of one lens structure 610 at least has an overlapping region with one light control region. Exemplarily, the orthographic projection, on the intermediate carrying substrate 400, of one lens structure 610 overlaps with one light control region. Exemplarily, the lens structure 610 may be arranged between the intermediate carrying substrate 400 and the liquid crystal layer. Alternatively, the lens structure 610 may be arranged on the side, facing away from the liquid crystal layer, of the intermediate carrying substrate 400. In this way, the light may be converged through the lens structure 610, thereby further increasing a light utilization rate.

Exemplarily, as shown in FIG. 8B, a lens layer is formed on one side, facing the intermediate carrying substrate 400, of the liquid crystal layer of the liquid crystal display. The lens layer includes a plurality of lens structures 610. An orthographic projection, on the intermediate carrying substrate 400, of one lens structure 610 at least has an overlapping region with one light control region. Exemplarily, the orthographic projection, on the intermediate carrying substrate 400, of one lens structure 610 overlaps with one light control region. Exemplarily, the lens structure 610 may be arranged between the array substrate and the liquid crystal layer. Alternatively, the lens structure 610 may be arranged between the array substrate and the bonding layer 510. Alternatively, the lens structure 610 may be arranged between the intermediate carrying substrate 400 and the bonding layer 510. Alternatively, the lens structure 610 may be arranged one side, facing away from the bonding layer 510, of the intermediate carrying substrate 400. In this way, the light may be converged through the lens structure 610, thereby further increasing a light utilization rate.

The process of the mass transfer method is illustrated below with reference to embodiments, but it should be understood that a process is not limited thereto.

Except for steps (1)-(5) in the embodiments described above, the mass transfer method according to embodiments of the present disclosure may further include following step (6).

(6) Through laser irradiation, the laser may be further converged to the light-transmitting light control regions (for example, KG1 and KG3) under the action of light convergence of the lens structure 610, so that the intermediate carrying substrate 400 may be separated from the micro light emitting diodes W, corresponding to the light-transmitting light control regions (for example, KG1 and KG3), on the intermediate carrying substrate 400 at a higher speed. Therefore, the micro light emitting diodes W on the intermediate carrying substrate 400 are transferred into the sub-pixels on the target substrate 100, so that the micro light emitting diodes W are received by all the sub-pixels on the target substrate 100 at a time, thereby shortening a process time.

Embodiments of the present disclosure provide yet some other mass transfer methods for micro light emitting diodes W, which makes variations to the implementation mode in the embodiments described above. Only the differences between the following embodiments and the embodiments described above are described below, and the similarities therebetween will not be repeated herein.

Figure 10:
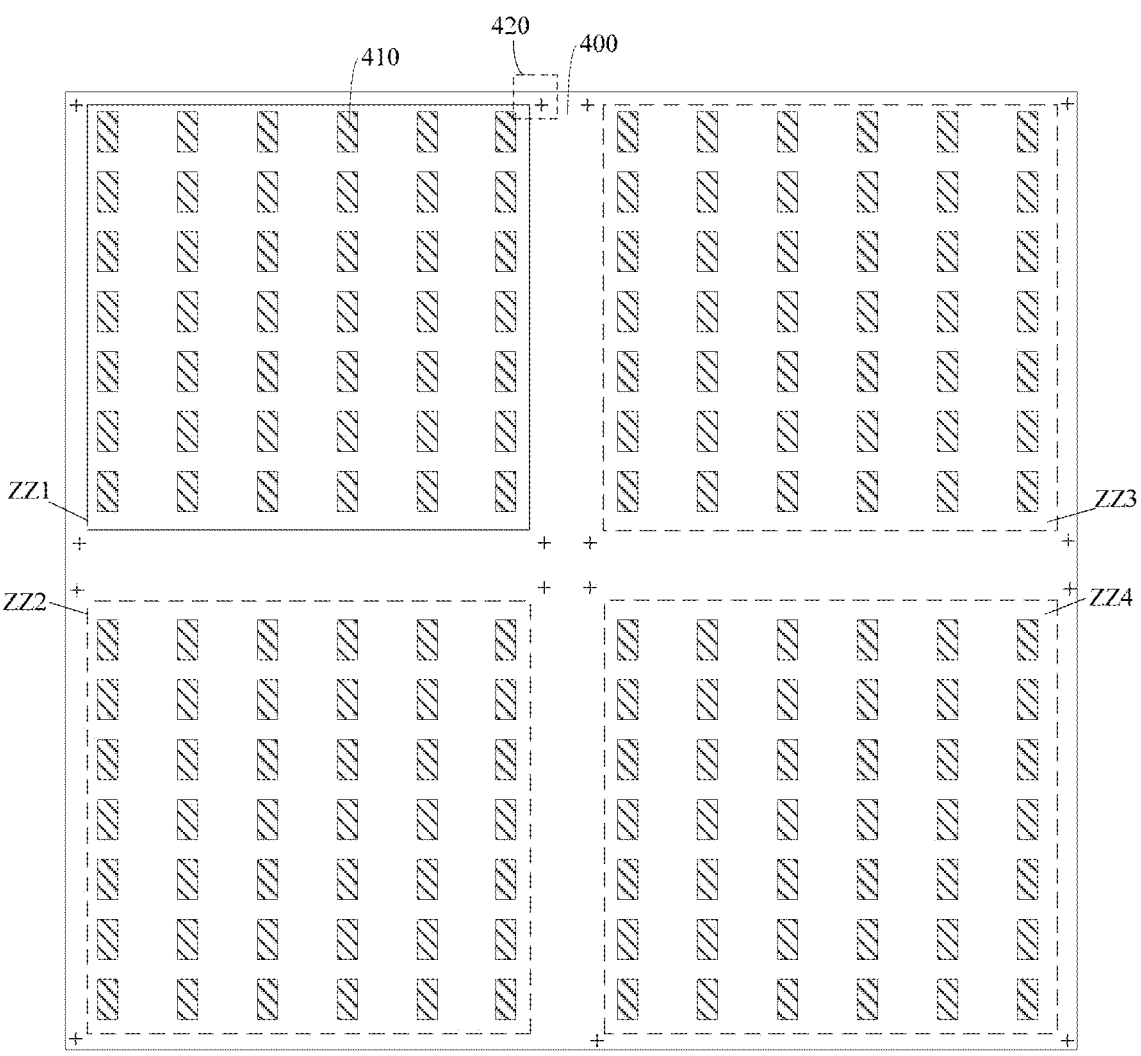
FIG. 10 shows some other top-view schematic structural diagrams of an intermediate carrying substrate according to an embodiment of the present disclosure.

During implementations, in embodiments of the present embodiment, the micro light emitting diodes W transferred to the intermediate carrying substrate 400 may have a greater quantity than the micro light emitting diodes W bonded on the transfer substrate 300. In this way, the number for transferring the micro light emitting diodes from the intermediate carrying substrate 400 to the target substrate 100 is reduced, thereby further improving the efficiency. Exemplarily, as shown in FIGS. 9 and 10, the intermediate carrying substrate 400 may be larger than the transfer substrate 300 in size, so that the micro light emitting diodes W carriable on the intermediate carrying substrate 400 may have a greater quantity than the micro light emitting diodes W carried on the transfer substrate 300. For example, the transfer substrate 300 may be not larger than the intermediate carrying region in size. Further, in practical applications, the size of the intermediate carrying substrate 400 may equal an integral multiple (for example, one, two, or more multiples) of that of the transfer substrate 300, which is required to be designed and determined according to practical application environments, and will not be limited herein.

During implementations, in embodiments of the present disclosure, one or more transfer substrates 300 may be provided. The step that the micro light emitting diodes W on an element substrate 200 are picked up through a transfer substrate 300 and transferred to an intermediate carrying substrate 400 after pickup may include: the micro light emitting diodes W on the element substrate 200 are picked up in a plurality of times separately through the transfer substrate 300, and micro light emitting diodes W picked up each time are transferred to the intermediate carrying substrate 400. Therefore, micro light emitting diodes W in each intermediate carrying region and sub-pixels in each display region are arranged in a one-to-one corresponding manner. Exemplarily, the micro light emitting diodes W on the element substrate 200 are picked up in the plurality of times separately through the bonding structures 310 on the transfer substrate 300 as shown in FIG. 9, the micro light emitting diodes W picked up each time are transferred to the intermediate carrying substrate 400, and positions of the micro light emitting diodes W are re-arranged after being transferred to the intermediate carrying substrate 400. Therefore, one micro light emitting diode W in the intermediate carrying region of the intermediate carrying substrate 400 and one sub-pixel in the display region of the target substrate 100 are arranged in a one-to-one corresponding manner, that is, the micro light emitting diodes W on one intermediate carrying substrate 400 correspond to the sub-pixels on one target substrate 100.

The step that micro light emitting diodes W, corresponding to all sub-pixels on a target substrate 100, on the intermediate carrying substrate 400 are transferred into the sub-pixels of the target substrate 100 at a time, so that the micro light emitting diodes W are received by all the sub-pixels on the target substrate 100 at a time may include:

the intermediate carrying substrate 400 is box-aligned with the target substrate 100 under a first set pressure;

the intermediate carrying substrate 400 and the target substrate 100 are press-fitted under a second set pressure; and all the micro light emitting diodes W on the intermediate carrying substrate 400 are electrically connected to the electrodes in the corresponding sub-pixels on the target substrate 100 at a time, so that the micro light emitting diodes W are received by all the sub-pixels on the target substrate 100 at a time.

Through the method described above, the micro light emitting diodes W may be transferred from the intermediate carrying substrate 400 to the target substrate 100 by changing the pressure.

Exemplarily, the second set pressure may be greater than the first set pressure. For example, the first set pressure may be not greater than $1.01 \times 10^3$ Pa. For example, the first set pressure may be not greater than $1.01 \times 10^2$ Pa, 10.1 Pa, 1.01 Pa, or 0.101 Pa, which will not be limited herein.

Exemplarily, the second set pressure may be set as $1.01 \times 10^5$ Pa. In other words, the second set pressure is set as one standard atmospheric pressure. Alternatively, the second set pressure may also be greater than $1.01 \times 10^5$ Pa. For example, the second set pressure may be set as $2.01 \times 10^5$ Pa or $3.01 \times 10^5$ Pa, which will not be limited herein.

In some examples, after the step that the micro light emitting diodes W on an element substrate 200 are picked up through a transfer substrate 300 and transferred to an intermediate carrying substrate 400 after pickup, and before the step that the intermediate carrying substrate 400 is box-aligned with the target substrate 100 under a first set pressure, the method may further include: a frame sealant surrounding the intermediate carrying regions is applied to one side, provided with the micro light emitting diodes W, of the intermediate carrying substrate 400.

In some examples, the step that the intermediate carrying substrate 400 is box-aligned with the target substrate 100 under a first set pressure may include:

a pressure in an alignment system is controlled to be a third set pressure, and the intermediate carrying substrate 400 and the target substrate 100 are placed into the alignment system, the third set pressure being greater than the first set pressure;

the pressure in the alignment system is controlled to be the first set pressure;

the intermediate carrying substrate 400 is controlled to be aligned with the target substrate 100, so that the micro light emitting diodes W in one intermediate carrying region are arranged corresponding to the sub-pixels in one display region; and the intermediate carrying substrate 400 is attached to the target substrate 100 by a first set time, so as to perform box-alignment through the frame sealant.

Exemplarily, the third set pressure is not less than $1.01 \times 10^5$ Pa. For example, the third set pressure may be set as $1.01 \times 10^5$ Pa. In other words, the third set pressure is set as one standard atmospheric pressure. Alternatively, the third set pressure may also be greater than $1.01 \times 10^5$ Pa. For example, the third set pressure may be set as $2.01 \times 10^5$ Pa or $3.01 \times 10^5$ Pa, which will not be limited herein.

In some examples, the step that the intermediate carrying substrate 400 and the target substrate 100 are press-fitted under a second set pressure may include:

the pressure in the alignment system is controlled to be the second set pressure; and the intermediate carrying substrate 400 and the target substrate 100 are press-fitted after a second set time. Exemplarily, the second set time may be designed and determined according to requirements of practical applications, which will not be limited herein.

In the examples described above, since the first set pressure is less than the second set pressure, the intermediate carrying substrate 400 and the target substrate 100 are controlled to be box-aligned with each other under the first set pressure, and a sealed space formed after the box-alignment may be formed through the frame sealant. A pressure in the sealed space equals the first set pressure, that is, the pressure in the sealed space is less than the second set pressure. When the pressure in the alignment system is set as the second set pressure, the intermediate carrying substrate 400 and the target substrate 100 may be tightly press-fitted more uniformly under the action of the pressure. A mechanical press-fitting apparatus may also be omitted.

In some examples, the step that the intermediate carrying substrate 400 and the target substrate 100 are press-fitted under a second set pressure may include:

the pressure in the alignment system is controlled to be the atmospheric pressure; and the intermediate carrying substrate 400 and the target substrate 100 are taken out of the alignment system to exposed to air, the atmospheric pressure is taken as the second set pressure, and the intermediate carrying substrate 400 and the target substrate 100 are press-fitted after a third set time.

In the examples described above, since the first set pressure is less than the atmospheric pressure, the intermediate carrying substrate 400 and the target substrate 100 are controlled to be box-aligned with each other under the first set pressure, and a sealed space formed after the box-alignment may be formed through the frame sealant. A pressure in the sealed space equals the first set pressure, that is, the pressure in the sealed space is less than the atmospheric pressure. After the intermediate carrying substrate 400 and the target substrate 100 which are box-aligned with each other are exposed to air, the intermediate carrying substrate 400 and the target substrate 100 may be tightly press-fitted more uniformly under the action of a pressure. A mechanical press-fitting apparatus may also be omitted.

Exemplarily, the alignment system may be a vacuum alignment system (VAS).

Figures 11A, 11B:
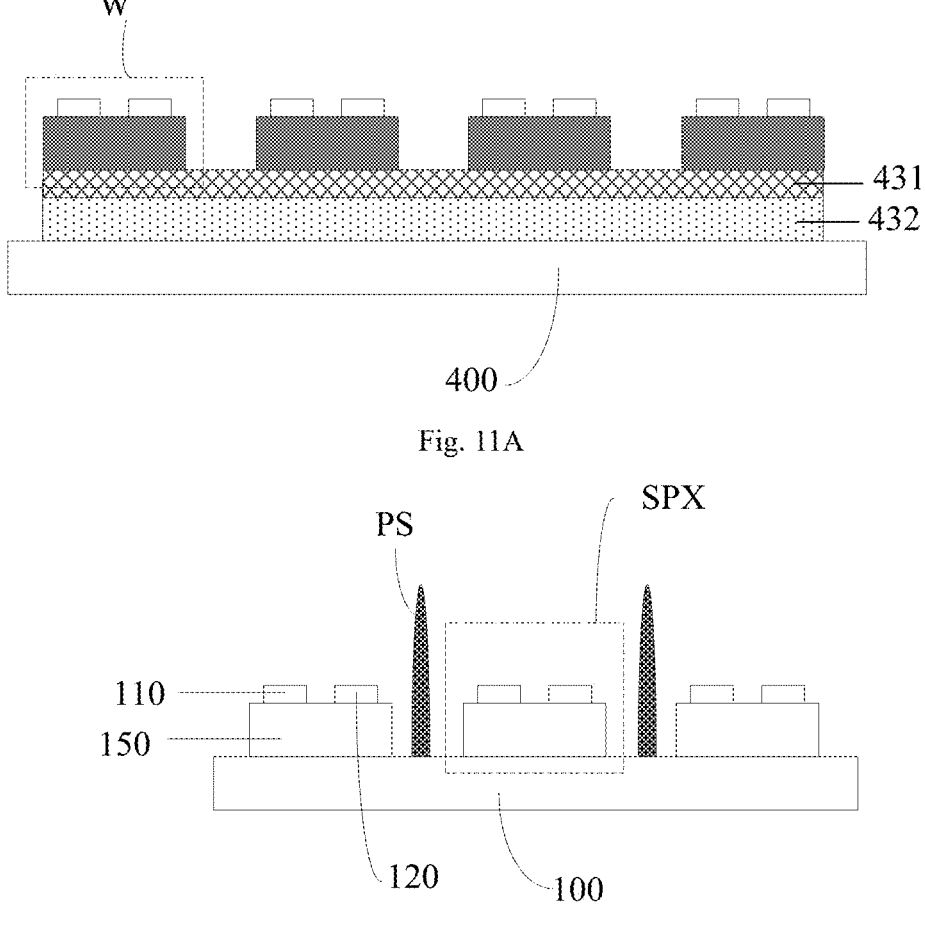
FIG. 11A shows yet some other sectional schematic structural diagrams of an intermediate carrying substrate according to an embodiment of the present disclosure.
FIG. 11B shows some other sectional schematic structural diagrams of a target substrate according to an embodiment of the present disclosure.

In some examples, as shown in FIG. 11A, an intermediate carrying adhesive layer 431 is formed between the intermediate carrying substrate 400 and the transferred micro light emitting diodes W. A thermoplastic resin layer 432 is formed between the intermediate carrying adhesive layer 431 and the intermediate carrying substrate 400. Exemplarily, the step that all the micro light emitting diodes W on the intermediate carrying substrate 400 are electrically connected to the electrodes in the corresponding sub-pixels on the target substrate 100 at a time may include:

a heating treatment is performed on the intermediate carrying substrate 400 and target substrate 100 which are press-fitted, to deform the thermoplastic resin layer 432; and a space formed after the intermediate carrying substrate 400 is box-aligned with the target substrate 100 is filled with the thermoplastic resin layer 432 and the intermediate carrying adhesive layer 431 is attached to the target substrate 100 after a set heating time, and all the micro light emitting diodes W on the intermediate carrying substrate 400 are electrically connected to the electrodes in the corresponding sub-pixels on the target substrate 100 at a time.

In the examples described above, during the heating treatment, the thermoplastic resin layer 432 may be deformed, and the sealed space formed after the box-alignment is filled with the thermoplastic resin layer 432. Therefore, the positive electrodes and the negative electrodes of the micro light emitting diodes W may be further electrically connected to the first electrodes and the second electrodes, respectively.

In some examples, as shown in FIG. 11B, post spacers PS may be further arranged on the target substrate 100, and the post spacers PS may be arranged on one side, facing away from the target substrate 100, of a layer where the first electrodes 110 and the second electrodes 120 are positioned. Exemplarily, the post spacers PS may be made of transparent materials. Exemplarily, the post spacers PS may have a height of 7 μm-12 μm. For example, the post spacers PS may have a height of 7 μm. The post spacers PS may have a height of 8 μm. The post spacers PS may have a height of 9 μm. The post spacers PS may have a height of 10 μm. The post spacers PS may have a height of 12 μm. Further, in practical applications, the height of the post spacers PS may be adjusted according to a height of the micro light emitting diodes to be received. For example, the height of the post spacers PS may be 2 um greater than that of the received micro light emitting diodes. In this way, the stress uniformity of the micro light emitting diodes in a press-fitting process may be optimized through the post spacers PS.

A process of the mass transfer method is described below with reference to embodiments, but it should be understood that a specific process is not limited thereto.

The mass transfer method for micro light emitting diodes W according to the embodiments of the present disclosure may include following steps.

(1) A plurality of wafers 200 provided with the micro light emitting diodes W distributed in an array are provided, as shown in FIGS. 3A and 3B. Reference may be made to the embodiments described above for a process, which will not be repeated herein.

(2) The micro light emitting diodes W on the element substrate 200 are picked up in a plurality of times separately through the transfer substrate 300, and micro light emitting diodes W picked up each time are transferred to the intermediate carrying substrate 400. Therefore, the micro light emitting diodes W in each intermediate carrying region and the sub-pixels in each display region are arranged in a one-to-one corresponding manner.

Exemplarily, the micro light emitting diodes W on the element substrate 200 are picked up in the plurality of times separately through the bonding structures 310 on the transfer substrate 300 as shown in FIG. 9, the micro light emitting diodes W picked up each time are transferred to the intermediate carrying substrate 400, and positions of the micro light emitting diodes W are re-arranged after being transferred to the intermediate carrying substrate 400. Therefore, one micro light emitting diode W in the intermediate carrying region of the intermediate carrying substrate 400 and one sub-pixel in the display region of the target substrate 100 are arranged in a one-to-one corresponding manner, that is, the micro light emitting diodes W on one intermediate carrying substrate 400 correspond to the sub-pixels on one target substrate 100.

(3) A pressure in an alignment system is controlled to be a third set pressure, and the intermediate carrying substrate 400 and the target substrate 100 are placed into the alignment system. Exemplarily, the third set pressure may be an atmospheric pressure.

(4) The pressure in the alignment system is controlled to be the first set pressure. Exemplarily, the first set pressure may be less than 1.01 Pa.

(5) The intermediate carrying substrate 400 is controlled to be aligned with the target substrate 100, so that the micro light emitting diodes W in one intermediate carrying region are arranged corresponding to the sub-pixels in one display region.

Figures 12, 13:
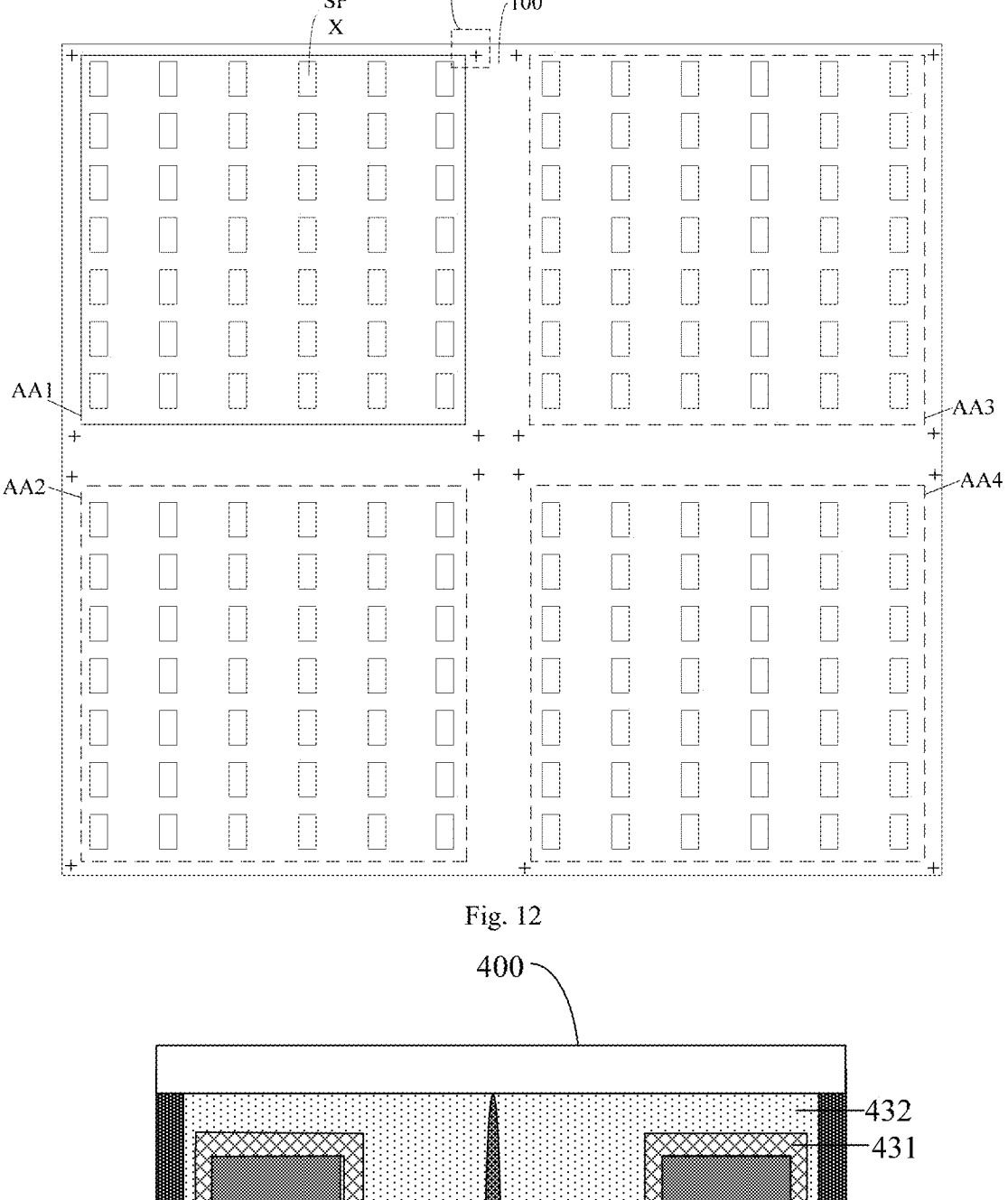
FIG. 12 shows some other top-view schematic structural diagrams of a target substrate according to an embodiment of the present disclosure.
FIG. 13 is a sectional schematic structural diagram of some micro light emitting diode display panels undergoing a mass transfer method according to an embodiment of the present disclosure.

Exemplarily, the intermediate carrying substrate 400 is aligned with the target substrate 100. As shown in FIGS. 10 and 12, the target substrate 100 is provided with target alignment marks 140. In this way, the intermediate carrying alignment marks 420 may be controlled to be aligned with the target alignment marks 140, so that one sub-pixel SPX in display region AA1 on the target substrate 100 is aligned with one micro light emitting diode W bonded in intermediate carrying region ZZ1 of the intermediate carrying substrate 400 in a one-to-one corresponding manner.

(6) The intermediate carrying substrate 400 is attached to the target substrate 100 by a first set time, so as to perform box-alignment through the frame sealant 434. Exemplarily, the first set time may be designed and determined according to requirements of practical applications, which will not be limited herein.

Exemplarily, the micro light emitting diodes W on the aligned intermediate carrying substrate 400 are attached to the first electrodes and the second electrodes in the corresponding sub-pixels of the target substrate 100 in a one-to-one corresponding manner, and a space formed after the box-alignment is formed into a sealed space under the sealing action of the frame sealant.

(7) The pressure in the alignment system is controlled to be the atmospheric pressure.

(8) The intermediate carrying substrate 400 and the target substrate 100 are taken out of the alignment system to exposed to air, the atmospheric pressure is taken as the second set pressure, and the intermediate carrying substrate 400 and the target substrate 100 are press-fitted after a third set time. Exemplarily, the third set time may be designed and determined according to requirements of practical applications, which will not be limited herein.

Since the first set pressure is less than the atmospheric pressure, a pressure in the sealed space formed after the box-alignment through the frame sealant equals the first set pressure, that is, the pressure in the sealed space is less than the atmospheric pressure. After the intermediate carrying substrate 400 and the target substrate 100 which are box-aligned with each other are exposed to air, the intermediate carrying substrate 400 and the target substrate 100 may be tightly press-fitted more uniformly under the action of a pressure. A mechanical press-fitting apparatus may also be omitted.

(9) A heating treatment is performed on the intermediate carrying substrate 400 and the target substrate 100 which are press-fitted, to deform the thermoplastic resin layer 432.

Exemplarily, the intermediate carrying substrate 400 and the target substrate 100 which are press-fitted are put into a heating furnace OVEN for a heating treatment, and the intermediate carrying substrate 400 and the target substrate 100 undergo an atmospheric pressure and heating in the heating furnace OVEN. Therefore, the thermoplastic resin layer 432 may recover a thermoplastic property under the action of a high temperature in the OVEN heating furnace, and deform under the action of the atmospheric pressure.

(10) A space formed after the intermediate carrying substrate 400 is box-aligned with the target substrate 100 is filled with the thermoplastic resin layer 432 and the intermediate carrying adhesive layer 431 is attached to the target substrate 100 after a set heating time, and all the micro light emitting diodes W on the intermediate carrying substrate 400 are electrically connected to the electrodes in the corresponding sub-pixels on the target substrate 100 at a time, as shown in FIG. 13. Exemplarily, the set heating time may be designed and determined according to requirements of practical applications, which will not be limited herein.

Exemplarily, as shown in FIG. 13, the thermoplastic resin layer 432 recovers the thermoplastic property under the action of the high temperature in the heating furnace OVEN, and deforms under the action of the atmospheric pressure within the set heating time. In a deformation process of the thermoplastic resin layer 432, the intermediate carrying adhesive layer 431 is attached to a main substrate, and vacuum regions between the micro light emitting diodes W are filled with the deformed thermoplastic resin layer 432, so as to electrically connect the positive electrodes and the negative electrodes of the micro light emitting diodes W to the first electrodes and the second electrodes, respectively.

Embodiments of the present disclosure provide still some other mass transfer methods for micro light emitting diodes W, which makes variations to the implementation mode in the embodiments described above. Only the differences between the following embodiments and the embodiments described above are described below, and the similarities therebetween will not be repeated herein.

In some examples, as shown in FIG. 13, the target substrate 100 may be a rigid substrate. For example, the intermediate carrying substrate 400 is provided as a glass substrate. The space formed after the intermediate carrying substrate 400 is box-aligned with the target substrate 100 is filled with the thermoplastic resin layer 432 and the intermediate carrying adhesive layer 431 is attached to the target substrate 100 after the set heating time described above. After all the micro light emitting diodes W on the intermediate carrying substrate 400 are electrically connected to the electrodes in the corresponding sub-pixels on the target substrate 100 at a time, the intermediate carrying substrate 400 may be taken as a protective cover plate instead of being removed, thereby simplifying a process flow, and improving a production efficiency and reliability of a panel.

In the embodiments described above, a rigid display panel having micro light emitting diodes W may be formed through the target substrate 100.

Embodiments of the present disclosure provide still some other mass transfer methods for micro light emitting diodes W, which makes variations to the implementation mode in the embodiments described above. Only the differences between the following embodiments and the embodiments described above are described below, and the similarities therebetween will not be repeated herein.

In some examples, the target substrate 100 may be a flexible substrate, one side, facing away from the electrodes, of the target substrate 100 is provided with a carrying substrate.

Though the flexible substrate is soft, the target substrate 100 may be carried by the rigid carrying substrate for manufacturing the driving circuit, etc.

Figures 14, 15:
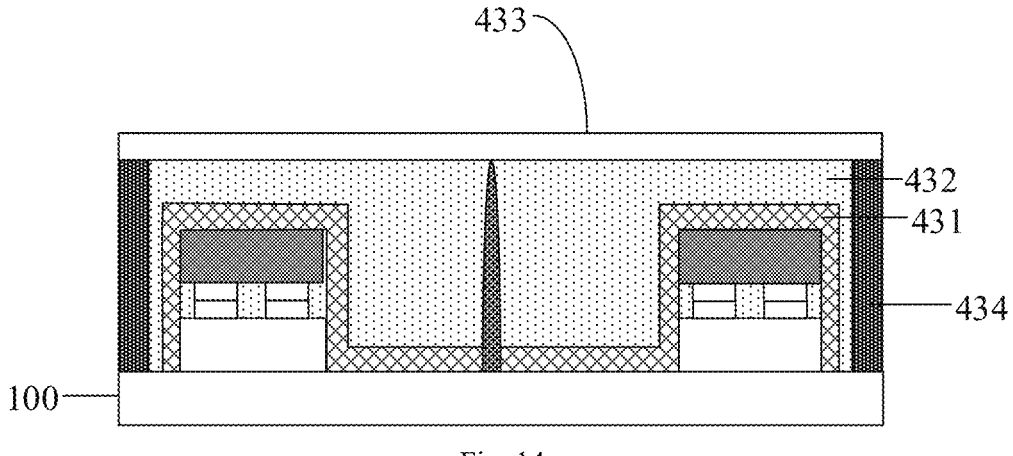
FIG. 14 shows yet some other sectional schematic structural diagrams of an intermediate carrying substrate according to an embodiment of the present disclosure.
FIG. 15 is a sectional schematic structural diagram of some other micro light emitting diode display panels undergoing a mass transfer method according to an embodiment of the present disclosure.

In some examples, the intermediate carrying substrate 400 may be provided as a glass substrate. As shown in FIG. 14, an intermediate carrying photo-dissociable adhesive layer 433 is formed between the thermoplastic resin layer 432 and the intermediate carrying substrate 400. Exemplarily, the intermediate carrying photo-dissociable adhesive layer 433 may be an ultraviolet photo-dissociable adhesive layer.

In some examples, after the step that all the micro light emitting diodes W on the intermediate carrying substrate 400 are electrically connected to the electrodes in the corresponding sub-pixels on the target substrate 100 at a time, so that the micro light emitting diodes W are received by all the sub-pixels on the target substrate 100 at a time, the method may further include:

the intermediate carrying substrate 400 is peeled off from the intermediate carrying photo-dissociable adhesive layer 433 through ultraviolet irradiation;

a protective film layer covering the photo-dissociable adhesive layer is formed on the target substrate 100 after the intermediate carrying substrate 400 is peeled off; and the carrying substrate is peeled off from the target substrate 100 through a laser.

Exemplarily, as shown in FIG. 15, a protective film layer 600 is further formed on one side, facing away from the target substrate 100, of the thermoplastic resin layer 432. Exemplarily, the protective film layer 600 may be made of an inorganic material, so as to block water and oxygen. Therefore, in the embodiments described above, a flexible display panel having micro light emitting diodes W may also be formed through the target substrate 100.

Embodiments of the present disclosure provide some display panels. As shown in FIGS. 13 and 15, the display panel may include:

a target substrate 100 including display regions and a frame sealant 434 surrounding the display regions;

an intermediate carrying adhesive layer 431 covering the display regions, an orthographic projection, on the target substrate 100, of the intermediate carrying adhesive layer 431 being positioned in an orthographic projection, on the target substrate 100, of the frame sealant 434;

a thermoplastic resin layer 432 covering the intermediate carrying adhesive layer 431, an orthographic projection, on the target substrate 100, of the thermoplastic resin layer 431 being positioned in an orthographic projection, on the target substrate 100, of the frame sealant 434; and a protective structure covering the thermoplastic resin layer 432 and the frame sealant 434.

The display regions are provided with a plurality of sub-pixels and post spacers PS arranged in gaps between the sub-pixels.

Each sub-pixel includes a micro light emitting diode.

In some examples, as shown in FIG. 15, the protective structure may be provided as a protective film layer.

In some examples, as shown in FIG. 13, the protective structure may be provided as a protective cover plate. In FIG. 15, the intermediate carrying substrate is directly taken as a protective cover plate.

Although the preferred embodiments of the present disclosure have been described, those skilled in the art can make additional alterations and modifications to these embodiments once they know the basic creative concept. Thus, it is intended that the appended claims are to be interpreted as including the preferred embodiments and all alterations and modifications that fall within the scope of the present disclosure.

Apparently, those skilled in the art can make various modifications and variations to the embodiments of the present disclosure without departing from the spirit and scope of the embodiments of the present disclosure. In this way, if these modifications and variations to the embodiments of the present disclosure fall within the scope of the claims of the present disclosure and their equivalents, it is intended that the present disclosure also encompass these modifications and variations.

What is claimed is:

1. A mass transfer method for micro light emitting diodes, comprising:

picking up the micro light emitting diodes on an element substrate through a transfer substrate and transferring the micro light emitting diodes after pickup to an intermediate carrying substrate; and transferring micro light emitting diodes, corresponding to all sub-pixels on a target substrate, on the intermediate carrying substrate into the sub-pixels of the target substrate at one time, so that all the sub-pixels on the target substrate receive micro light emitting diodes at one time;

wherein a light control substrate is formed on one side, facing away from the micro light emitting diodes transferred, of the intermediate carrying substrate, the light control substrate is provided with a plurality of light control regions which are arranged at intervals, and an orthographic projection, on the intermediate carrying substrate, of one of the light control regions covers an orthographic projection, on the intermediate carrying substrate, of one of the micro light emitting diodes on the intermediate carrying substrate; a gap between two adjacent sub-pixels in the target substrate covers at least one micro light emitting diode; and said transferring micro light emitting diodes, corresponding to all sub-pixels on a target substrate, on the intermediate carrying substrate into the sub-pixels of the target substrate at one time, so that all the sub-pixels on the target substrate receive micro light emitting diodes at one time comprises:

aligning the intermediate carrying substrate with the target substrate for attachment;

controlling light control regions, corresponding to the sub-pixels of the target substrate, of the light control substrate to transmit light, and controlling other light control regions to shield light; and separating micro light emitting diodes, corresponding to the light control regions transmitting light, on the intermediate carrying substrate from the intermediate carrying substrate through laser irradiation, to transfer the micro light emitting diodes, corresponding to the light control regions transmitting light, on the intermediate carrying substrate into the sub-pixels on the target substrate, so that all the sub-pixels on the target substrate receive micro light emitting diodes at a time.

2. The mass transfer method for micro light emitting diodes according to claim 1, wherein the light control substrate is a liquid crystal display, and the intermediate carrying substrate serves as a substrate of an array substrate in the liquid crystal display.

3. The mass transfer method for micro light emitting diodes according to claim 1, wherein the light control substrate is a liquid crystal display, the intermediate carrying substrate is positioned on one side, facing away from of a liquid crystal layer, of an array substrate in the liquid crystal display, and a bonding layer is formed between the intermediate carrying substrate and the array substrate.

4. The mass transfer method for micro light emitting diodes according to claim 2, wherein a lens layer is formed on one side, facing the intermediate carrying substrate, of the liquid crystal layer of the liquid crystal display, the lens layer comprises a plurality of lens structures, and an orthographic projection, on the intermediate carrying substrate, of one of the lens structures at least has an overlapping region with one of the light control regions.

5. The mass transfer method for micro light emitting diodes according to claim 1, wherein said picking up the micro light emitting diodes on an element substrate through a transfer substrate and transferring the micro light emitting diodes after pickup to an intermediate carrying substrate comprises:

picking up all micro light emitting diodes, corresponding to a transfer region, on the element substrate through the transfer substrate, the element substrate being provided with a plurality of micro light emitting diodes, the transfer substrate comprising a plurality of transfer regions, and an orthographic projection, on the element substrate, of one of the transfer regions being positioned in the element substrate; and transferring the micro light emitting diodes on the transfer substrate to the intermediate carrying substrate at one time, the intermediate carrying substrate comprising a plurality of intermediate carrying regions, and one of the intermediate carrying regions corresponding to one of the transfer regions.

6. The mass transfer method for micro light emitting diodes according to claim 2, wherein:

a distance between two adjacent intermediate carrying regions equals an integral multiple of a width of one micro light emitting diode on the element substrate; and/or a distance between the sub-pixels of the target substrate equals an integral multiple of a width of one micro light emitting diode on the intermediate carrying substrate.

7. A display panel, comprising:

a target substrate comprising:

display regions; and a frame sealant surrounding the display regions;

an intermediate carrying adhesive layer covering the display regions, an orthographic projection, on the target substrate, of the intermediate carrying adhesive layer being positioned in an orthographic projection, on the target substrate, of the frame sealant;

a thermoplastic resin layer covering the intermediate carrying adhesive layer, an orthographic projection, on the target substrate, of the thermoplastic resin layer being positioned in an orthographic projection, on the target substrate, of the frame sealant; and a protective structure covering the thermoplastic resin layer and the frame sealant;

wherein the display regions are provided with a plurality of sub-pixels and post spacers arranged in gaps between the sub-pixels; and each sub-pixel comprising a micro light emitting diode.

8. The display panel according to claim 7, wherein the protective structure is at least one of a protective film layer or a protective cover plate.

9. A mass transfer method for micro light emitting diodes, comprising:

picking up the micro light emitting diodes on an element substrate through a transfer substrate and transferring the micro light emitting diodes after pickup to an intermediate carrying substrate; and transferring micro light emitting diodes, corresponding to all sub-pixels on a target substrate, on the intermediate carrying substrate into the sub-pixels of the target substrate at one time, so that all the sub-pixels on the target substrate receive micro light emitting diodes at one time;

wherein said transferring micro light emitting diodes, corresponding to all sub-pixels on a target substrate, on the intermediate carrying substrate into the sub-pixels of the target substrate at one time, so that all the sub-pixels on the target substrate receive micro light emitting diodes at one time comprises:

box-aligning the intermediate carrying substrate with the target substrate under a first set pressure;

press-fitting the intermediate carrying substrate and the target substrate under a second set pressure; and electrically connecting the micro light emitting diodes, corresponding to all sub-pixels on a target substrate, on the intermediate carrying substrate to electrodes in the corresponding sub-pixels on the target substrate at one time, so that all the sub-pixels on the target substrate receive micro light emitting diodes at one time, one micro light emitting diode on the intermediate carrying substrate corresponding to one sub-pixel on the target substrate, and the second set pressure being greater than the first set pressure.

10. The mass transfer method for micro light emitting diodes according to claim 9, wherein the intermediate carrying substrate comprises a plurality of intermediate carrying regions, the intermediate carrying regions is provided with the micro light emitting diodes transferred;

the target substrate comprises a plurality of display regions, the display regions is provided with the sub-pixels, and one of the display regions corresponding to one of the intermediate carrying regions;

after said picking up the micro light emitting diodes on an element substrate through a transfer substrate and transferring the micro light emitting diodes after pickup to an intermediate carrying substrate, and before said box-aligning the intermediate carrying substrate with the target substrate under a first set pressure, the method further comprises:

applying a frame sealant surrounding the intermediate carrying regions to one side, provided with the micro light emitting diodes, of the intermediate carrying substrate; and said box-aligning the intermediate carrying substrate with the target substrate under a first set pressure comprises:

controlling a pressure in an alignment system to be a third set pressure, and placing the intermediate carrying substrate and the target substrate into the alignment system, the third set pressure being greater than the first set pressure;

controlling the pressure in the alignment system to be the first set pressure;

controlling the intermediate carrying substrate to be aligned with the target substrate, so that micro light emitting diodes in one of the intermediate carrying regions are arranged corresponding to sub-pixels in one of the display regions; and attaching the intermediate carrying substrate to the target substrate by a first set time, so as to perform box-alignment through the frame sealant.

11. The mass transfer method for micro light emitting diodes according to claim 10, wherein said press-fitting the intermediate carrying substrate and the target substrate under a second set pressure comprises:

controlling the pressure in the alignment system to be the second set pressure; and press-fitting the intermediate carrying substrate and the target substrate after a second set time.

12. The mass transfer method for micro light emitting diodes according to claim 10, wherein said press-fitting the intermediate carrying substrate and the target substrate under a second set pressure comprises:

controlling the pressure in the alignment system to be an atmospheric pressure; and taking out the intermediate carrying substrate and the target substrate from the alignment system, to expose the intermediate carrying substrate and the target substrate to air, taking the atmospheric pressure as the second set pressure, and press-fitting the intermediate carrying substrate and the target substrate after a third set time.

13. The mass transfer method for micro light emitting diodes according to claim 9, wherein the first set pressure is not greater than $1.01 \times 10^3$ Pa; and/or the third set pressure is not less than $1.01 \times 10^5$ Pa.

14. The mass transfer method for micro light emitting diodes according to claim 9, wherein the second set pressure is not less than $1.01 \times 10^5$ Pa.

15. The mass transfer method for micro light emitting diodes according to claim 9, wherein an intermediate carrying adhesive layer is formed between the intermediate carrying substrate and the micro light emitting diodes transferred, a thermoplastic resin layer is formed between the intermediate carrying adhesive layer and the intermediate carrying substrate; and said electrically connecting the micro light emitting diodes, corresponding to all sub-pixels on a target substrate, on the intermediate carrying substrate to electrodes in the corresponding sub-pixels on the target substrate at one time comprises:

performing a heating treatment on the intermediate carrying substrate and target substrate which are press-fitted, to deform the thermoplastic resin layer; and filling a space formed after the intermediate carrying substrate is box-aligned with the target substrate with the thermoplastic resin layer and attaching the intermediate carrying adhesive layer to the target substrate after a set heating time, and electrically connecting the micro light emitting diodes on the intermediate carrying substrate to the electrodes in the corresponding sub-pixels on the target substrate at one time.

16. The mass transfer method for micro light emitting diodes according to claim 9, wherein:

the target substrate is a rigid substrate; or the target substrate is a flexible substrate, one side, facing away from the electrodes, of the target substrate being provided with a carrying substrate, and an intermediate carrying photo-dissociable adhesive layer is formed between the thermoplastic resin layer and the intermediate carrying substrate; and after said electrically connecting the micro light emitting diodes, corresponding to all sub-pixels on a target substrate, on the intermediate carrying substrate to electrodes in the corresponding sub-pixels on the target substrate at one time, so that all the sub-pixels on the target substrate receive micro light emitting diodes at one time, the method further comprises:

peeling off the intermediate carrying substrate from the intermediate carrying photo-dissociable adhesive layer through ultraviolet irradiation;

forming a protective film layer covering the photo-dissociable adhesive layer on the target substrate after the intermediate carrying substrate is peeled off; and peeling off the carrying substrate from the target substrate through a laser.

17. The mass transfer method for micro light emitting diodes according to claim 9, wherein said picking up the micro light emitting diodes on an element substrate through a transfer substrate and transferring the micro light emitting diodes after pickup to an intermediate carrying substrate comprises:

picking up all micro light emitting diodes, corresponding to a transfer region, on the element substrate through the transfer substrate, the element substrate being provided with a plurality of micro light emitting diodes, the transfer substrate comprising a plurality of transfer regions, and an orthographic projection, on the element substrate, of one of the transfer regions being positioned in the element substrate; and transferring the micro light emitting diodes on the transfer substrate to the intermediate carrying substrate at one time, the intermediate carrying substrate comprising a plurality of intermediate carrying regions, and one of the intermediate carrying regions corresponding to one of the transfer regions.

18. The mass transfer method for micro light emitting diodes according to claim 17, wherein:

a distance between two adjacent intermediate carrying regions equals an integral multiple of a width of one micro light emitting diode on the element substrate; and/or a distance between the sub-pixels of the target substrate equals an integral multiple of a width of one micro light emitting diode on the intermediate carrying substrate.

* * * * *